(12) United States Patent
Endo et al.

(10) Patent No.: US 6,359,571 B1
(45) Date of Patent: Mar. 19, 2002

(54) BROADCASTING TYPE INFORMATION PROVIDING SYSTEM AND TRAVEL ENVIRONMENT INFORMATION COLLECTING DEVICE

(75) Inventors: Yoshinori Endo, Mito; Kozo Nakamura, Hitachioota; Toshio Fujiwara, Zama; Ke'nichirou Kurata, Hitachinaka; Hideo Hiroshige; Hiroshi Kuroda, both of Hitachi; Ichiro Hondo, Naka-machi; Okude Mariko, Hitachi, all of (JP)

(73) Assignees: Hitachi, Ltd., Tokyo; Xanavi Informatics Corp., Kanagawa, both of (JP)

( * ) Notice: Subject to any disclaimer, the term of this patent is extended or adjusted under 35 U.S.C. 154(b) by 0 days.

(21) Appl. No.: 09/417,483

(22) Filed: Oct. 13, 1999

(30) Foreign Application Priority Data

Oct. 13, 1998 (JP) .............................. 10-290761
Oct. 13, 1998 (JP) .............................. 10-290762

(51) Int. Cl.[7] ............................... G08B 1/123
(52) U.S. Cl. ...................... 340/988; 340/905
(58) Field of Search ................ 340/905, 988, 340/995, 989, 990, 991, 993, 825.44; 701/117, 119, 229; 455/4.2, 422

(56) References Cited

U.S. PATENT DOCUMENTS

| | | | | |
|---|---|---|---|---|
| 5,131,020 A | * | 7/1992 | Liebesny et al. ............ 455/422 |
| 5,164,904 A | * | 11/1992 | Sumner ....................... 701/117 |
| 5,539,645 A | * | 7/1996 | Mandhyan et al. ......... 701/119 |
| 5,594,779 A | * | 1/1997 | Goodman ................... 455/4.2 |
| 5,689,252 A | * | 11/1997 | Ayanoglu et al. ........... 340/991 |
| 5,699,056 A | * | 12/1997 | Yoshida ...................... 340/905 |
| 5,864,305 A | * | 1/1999 | Rosenquist ................. 340/905 |
| 5,889,473 A | * | 3/1999 | Wicks .................... 340/825.44 |
| 5,919,246 A | * | 7/1999 | Waizmann et al. ......... 701/209 |
| 5,982,298 A | * | 11/1999 | Lappenbusch et al. ...... 340/905 |

FOREIGN PATENT DOCUMENTS

JP 5-151496 6/1993

OTHER PUBLICATIONS

"Audio quality vs. Data Services—a possible conflict?" Christer Grewin (SR) Third International Symposium on Digital Audio Broadcasting (Montreux, Switzerland) Jun. 4–5, 1996, pp. 1–4.

* cited by examiner

Primary Examiner—Jeffrey Hofsass
(74) Attorney, Agent, or Firm—Crowell & Moring LLP

(57) ABSTRACT

In a broadcasting type information providing system, a moving body 10 includes a bidirectional communication unit 13 which performs communication with an information providing center 21, an information processing unit 11 which communicates request information necessary for a user via the bidirectional communication unit 13 to the information providing center 21 as well as presents answer information with respect to the request information to the user and a broadcast receiving unit 14 which receives the answer information broadcasted from a broadcasting station 22, and the information providing center 21 generates the answer information with respect to the request information being transmitted from the moving body 10 as well as selects a broadcasting station 22 of which service area covers the position of the moving body 10 depending on the position of the moving body 10 detected either at the side of the moving body 10 or at the side of the information providing center 21 and causes the selected broadcasting station 21 to broadcast the answer information, thereby when transferring information from the information providing center 21 to the moving body 10, an optimum communication means and broadcasting station can be selected.

28 Claims, 16 Drawing Sheets

FIG. 1
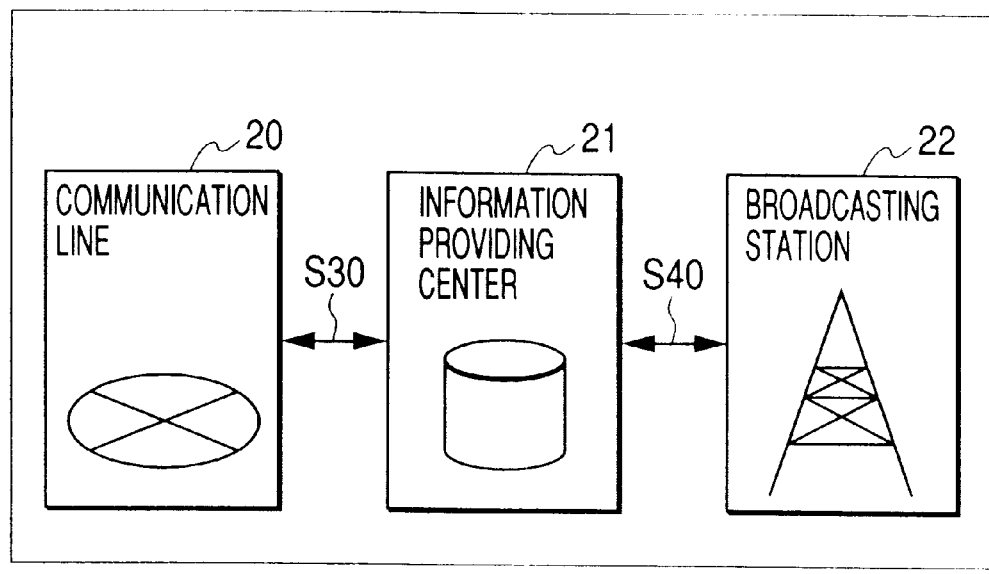
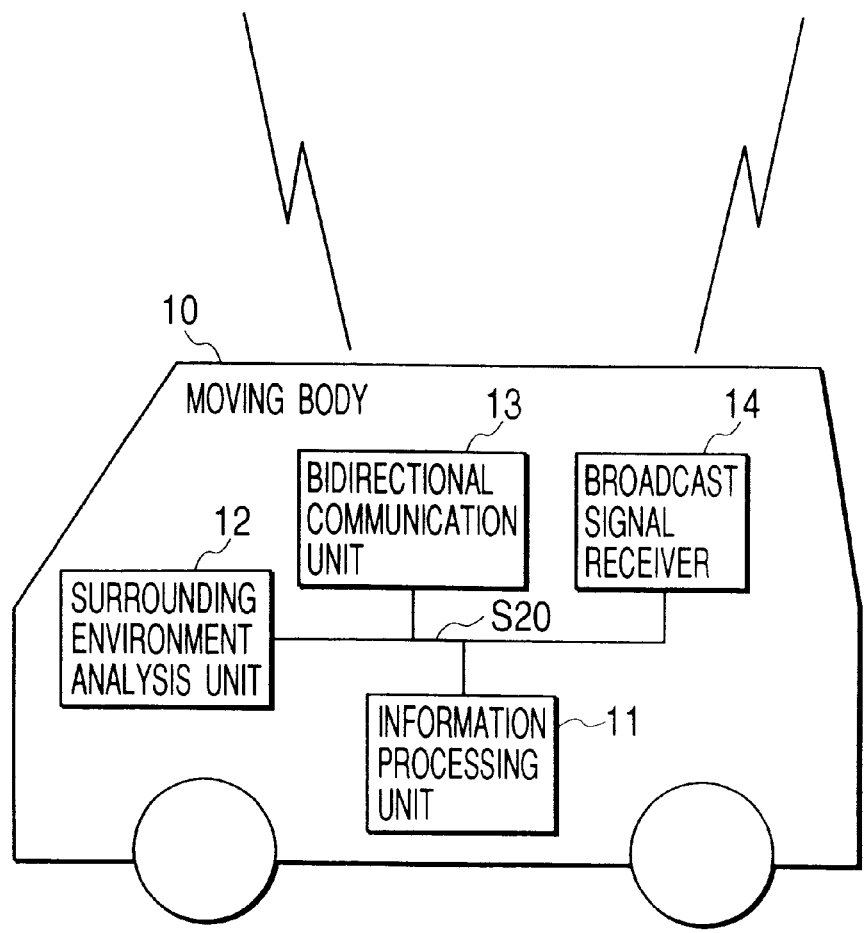

| LINK NO. | JAMMING INFO. | READ CONDITION INFO. | WEATHER INFO. | UPDATE TIME |
|---|---|---|---|---|
| Link 1 | UP JAMMING<br>DOWN NO JAMMING | UP OBSTACLE<br>DOWN NO OBSTACLE | SNOW | XX:XX |
| Link 2 | UP JAMMING<br>DOWN NO JAMMING | UP SLIPPING<br>DOWN NO OBSTACLE | SNOW | XX:XY |
| | | | | |

FIG. 16

| LINK NO. | JAMMING INFO. | READ CONDITION INFO. | WEATHER INFO. | MOVE-IN TIME TO LINK | MOVE-OUT TIME FROM LINK |
|---|---|---|---|---|---|
| Link 1 | UP JAMMING<br>DOWN NO JAMMING | UP OBSTACLE<br>DOWN NO OBSTACLE | SNOW | XX:X0 | XX:X1 |
| Link 2 | UP JAMMING<br>DOWN NO JAMMING | UP SLIPPING<br>DOWN NO OBSTACLE | SNOW | XX:X1 | XX:X2 |
| ⋮ | ⋮ | ⋮ | ⋮ | ⋮ | ⋮ |

301a, 301b, 301c, 301d, 301e

BROADCASTING TYPE INFORMATION PROVIDING SYSTEM AND TRAVEL ENVIRONMENT INFORMATION COLLECTING DEVICE

BACKGROUND OF THE INVENTION

1. Field of the Invention

The present invention relates to a broadcasting type information providing system which permits an information collecting device mounted on a moving body to obtain information stored in an information providing center via a communication line and a broadcasting line, and to the information collecting device mounted on a moving body, in particular, a travel environment information collecting device which efficiently transmits travel environment information such as traffic jam to a predetermined station such as an information providing center.

2. Conventional Art

A device which provides a variety of information to a moving body or vehicle so as to enhance comfort and safety in the moving vehicle is now being developed. A typical device of such devices is a car navigation system which calculates the shortest route to a destination by making use of such as map information and guidance information stored in the moving vehicle and navigates the same with such as a displayed map and voices. In such car navigation system, the map information and guidance information are stored in a large capacity memory medium such as CD-ROM and DVD. Although the information volume stored in such memory medium is enormous, the information is static one so that a dynamic information such as vacancy information in a parking lot, road traffic jam information and road condition information including an obstacle on the road at a desired moment can not be provided to a driver.

On one hand, recently a moving body communication device such as a portable phone and PHS is rapidly spreading, and a broad communication network including moving bodies is being established.

In one of already established examples of such system which permits to provide such dynamic information, an information service center is provided, and a user accesses the information service center via such as a portable phone or PHS installed in the moving body and obtains desired information via a communication line. The obtained information is displayed as image information on a display provided in a navigation device or is transferred to a driver via a voice synthesizer.

Although through the use of the above referred to moving body communication device the dynamic information can be provided to a user in a moving body as has been explained above, there arose the following problems.

Firstly, the capacity of the communication line is small. The digital data transferring speed for the portable phone and PHS which is now reduced into practice is from 9.6 KBPS to 32 KBPS, therefore, when communicating image information, it takes about 10 sec. for transmitting one screen image which deteriorates the response characteristic.

Secondly, a cost incurred for the communication is high. Further, since the communication cost is proportional to the communication time, when communicating image information, the communication time prolongs as has been explained above to increase the communication cost.

Thirdly, communication quality during moving is poor. This is caused by such as fading generated in the communication path, and the communication speed decreases in proportion to increase of bit error rate in the communication line and in the worst case the communication will be interrupted.

As a method of resolving the above problems, a method is studied in which dynamic information is transferred to a driver via a digital broadcasting line having a further higher quality as disclosed in Christer Grewin, "Audio Quality vs. Data Services—a Possible Conflict?" (Third International Symposium on Digital Audio Broadcasting, Jun. 4–5 1996. Montreux Switzerland). Although the digital broadcasting line is limited to a unidirectional data transmission from the side of a broadcasting station to a user, the digital broadcasting line has a communication capacity of several MBPS with regard to an audio line and of several tens MBPS with regard to animating image. Further, in order to apply a technology such as image compression the communication capacity is designed to meet the worst case.

Further, when the data compression rate is high, namely, such as when monotonous images continue and when static images are transmitted, the compression rate is inherently heightened, and a band which is not used for general broadcasting is generated in the communication band. Therefore, if the communication information from the information service center to the moving body is superposed on the empty band and a broadcast receiving device installed at the side of the moving body separates the communication information, information can be obtained via the communication line having a high speed and stability.

Further, as a system which provides dynamic information, a system is already in use in which a traffic stream volume is measured by making use of such as cameras, ultrasonic wave sensors and photo sensors disposed along roads to discriminate between traffic jamming and non-traffic jamming based on the measured volume, and the traffic information is provided to a moving body via a communication path including FM multiplex channel broadcasting and radio wave, photo beacon. Further, another system is also practically used in which a plurality of photo beacons which enable bidirectional communication are disposed along roads and traffic jamming information is collected by measuring travel time of a moving body between the beacons disposed at the road side.

These systems collect traffic information in real time by making use of a variety of information collecting devices such as cameras, ultrasonic sensors and photo beacons disposed at the sides of roads.

Further, a still further system is disclosed in JP-A-5-151496 (1993) in which a moving body communication is used and traffic information collected by the moving body itself is transmitted to the side of an information providing center, and the information providing center determines traffic information such as traffic jam by collecting these respective traffic information.

In a moving body communication device, a specific cell where the moving body exists now is judged, and a communication is performed via a base station installed in the specific cell. In order to judge a specific cell where the moving body exists, periodical communication is performed between the terminal side of the moving body communication device and the base station side, and the specific cell where the terminal exists is judged.

On the other hand, even when information is transmitted via a broadcasting station, there is a problem that it has to be judged whether a moving body which receives information exists in a service area of the broadcasting station, and information has to be provided to the moving body from the broadcasting station of which service area covers the position where the moving body exists now.

Further, when obtaining information via broadcasting, there is another problem that waiting time until answer information is transmitted tends to be prolonged in comparison with when a bidirectional communication is used. This is because that an instance sometimes happens which requires a waiting time when superposing the answer information on general information, and because of existence of other users the broadcasting line sometimes becomes crowded.

Still further, with regard to the broadcasting receiving device, except when a user is receiving the broadcasting, the power source therefor is turned off. Accordingly, there arises further problem that it is necessary to turn on and off the power source by a proper measure depending on necessity.

With regard to the above explained method in which the traffic information is collected by making use of such as photo beacons, since it is necessary to dispose sensors along the road sides, an enormous number of ultrasonic wave sensors and photo sensors is necessitated depending on number of roads which incurs substantial investment cost. Further, with the ultrasonic wave sensors and the photo sensors, basically only information is obtained with regard to vehicles which have passed under these sensors, therefore, information generated in a region between sensors can not be obtained. Further, it is of course true that no information can not be obtained for regions where no sensors are disposed.

On the other hand, with regard to the method in which through the use of the moving body communication the traffic information collected by the moving body is transmitted to the information providing center, it is possible to resolve the problem encountered in the above beacon method, however, in order to maintain newness of the collected information it is necessary to frequently transmit collected information to the side of the information center which increases communication cost and, resultantly, causes disadvantage of service fee increase to users.

Still further, in order to fulfill accuracy, reliability and real time characteristics of the traffic information it is necessary to obtain traffic information at the same time from a predetermined number of moving bodies, therefore, there is another problem that if a substantial number of terminals is not prepared at the information providing center, the communication line overflows.

SUMMARY OF THE INVENTION

An object of the present invention is to provide a broadcasting type information providing system which resolves the above problems.

Another object of the present invention is to provide a broadcasting type information providing system which can operate so as to provide answer information to a user while selecting an optimum communication route and an optimum broadcasting station.

Still another, object of the present invention is to provide a travel environment information collecting device mounted on a moving body for collecting travel environment information which permits reduction of communication traffic when transmitting collected information to the side of an information center.

A further object of the present invention is to provide an information providing system being provided with an information center which stores information from travel environment information collecting devices mounted respectively on a plurality of moving bodies and transmits the stored information to the respective moving bodies, and which information providing system permits efficient collection of road environment information through further limited communication by controlling the transmission timing of the road environment information collected by the respective moving bodies to the side of the information center.

A broadcasting type information providing system including a moving body side device mounted on a moving body and an information providing side device for providing information to the moving body side device according to the present invention which achieves the above objects, is characterized in that the moving body side device comprises a moving body side communication means which performs bidirectional communication with the information providing side device; an information requesting means which transmits request information representing request contents of a user to the information providing side device via the moving body side communication means; a receiving means which receives answer information with respect to the request information being transmitted from the information providing side device; and an information presenting means which presents the received answer information to the user, and in that the information providing side device comprises a first information providing side communication means which performs bidirectional communication with the moving body side communication means; an answer information editing means which generates answer information to the request information transmitted from the moving body via the first information providing side communication means; a second information providing side communication means which performs communication with a broadcasting installation performing broadcasting for a specific service area so as to transmit the answer information to the moving body; and a control means which selects a broadcasting installation of which service area includes a position at which the moving body receives the answer information based on the position information of the moving body detected either by the moving body side device or by the information providing side device, transmits the answer information to the selected broadcasting installation via the second information providing side communication means and causes to broadcast the answer information from the selected broadcasting installation, whereby the broadcasting type information providing system operates so that an optimum broadcasting station is selected depending on the position of the moving body, thereby information can always be received under an optimum condition.

Further, in the broadcasting type information providing system according to the invention which achieves the above objects, it is possible to modify the system in such a manner that predetermined items with regard to generation and transmission of the answer information are evaluated and when transmitting the answer information it is determined whether the answer information be transmitted via the first information providing side communication means or via the selected broadcasting installation depending on the evaluation result of the predetermined items. Herein, as the evaluation items it is preferable to use at least one of a crowded degree of broadcasting signals in the broadcasting installation in which the answer information is to be broadcasted, a communication speed between the information providing side communication means and the moving body side communication means, data volume in the answer information, a required time for generating the answer information and a time dependency of the answer information. Thereby, a user can obtain the answer information via an optimum communication route.

A broadcasting type information providing system including a moving body side device mounted on a moving body and an information providing side device for providing information to the moving body side device according to the present invention which achieves the above objects, is characterized in that the moving body side device comprises a moving body side communication means which performs bidirectional communication with the information providing side device; an information requesting means which transmits request information representing request contents of a user to the information providing side device via the moving body side communication means; a broadcast receiving means which receives answer information with respect to the request information being broadcasted from the information providing side device; and an information presenting means which presents the received answer information to the user, and in that the information providing side device comprises a first information providing side communication means which performs bidirectional communication with the moving body side communication means; an answer information editing means which generates answer information to the request information transmitted from the moving body via the first information providing side communication means; and a broadcasting means for transmitting the answer information to the moving body, and is further characterized in that the moving body side device further comprises a device control means for controlling the broadcast receiving means so as to receive broadcasting of the answer information by the broadcasting means, wherein the device control means, for example, performs on and off of a power source and changing-over of receiving channels for the broadcast receiving means depending on broadcast schedule of the answer information which is to be transmitted via the moving body side communication means.

A travel environment informations collecting device mounted on a vehicle according to the present invention which achieves the above objects comprises a collecting means which collects travel environment information of a road on which the vehicle concerned is travelling; a receiver means which receives travel environment information being transmitted from an information center which stores in advance travel environment information; a judgement means which judges whether a processing of updating or new generation for a part of the received travel environment information is necessary by making use the collected travel environment information; and a transmitting means which transmits the travel environment information collected by the collecting means and to be used for the concerned processing to the information center when the judgement means judges that either the updating processing or the new generation processing is necessary.

The above travel environment information collecting device according to the present invention may further comprise a position measurement means which measures the position of the vehicle, wherein the judgement means retrieves travel environment information corresponding to the measured position depending on the measured position information and the received travel environment information, compares the retrieved result and the collected travel environment information and judges the necessity of the updating processing or the new generation processing based on the comparison result.

Further, a travel environment information collecting device mounted on a vehicle according to the present invention which achieves the above objects comprises: a collecting means which collects travel environment information of a road on which the vehicle concerned is travelling; a receiver means which receives travel environment information being transmitted from outside; a comparison means which compares the collected travel environment information with the travel environment information corresponding to the collected travel environment information among the received travel environment information; and a transmitter means which transmits the travel environment information collected by the collecting means to an information center installed in the outside when the two travel environment informations compared in the comparison means are judged different.

Further, a travel environment information collecting device mounted on a vehicle according to the present invention which achieves the above objects comprises: a collecting means which collects travel environment information of a road on which the vehicle concerned is travelling; a receiver means which receives travel environment information being transmitted from outside; a judgement means which judged whether information relating to the road on which the vehicle concerned is now travelling is included in the received travel environment information; and a transmitting means which, when the judgement means judges that the information relating to the road on which the vehicle concerned is now travelling is not included in the received travel environment information, transmits the travel environment information collected by the collecting means with regard to the road region which is judged not included in the received travel environment information to an information center installed in the outside.

Further, a travel environment information collecting device mounted on a vehicle according to the present invention which achieves the above objects comprises: a collecting means which collects travel environment information of a road on which the vehicle concerned is travelling; an environmental change judgement means which judges whether an environment change has happened for the vehicle concerned; and a transmitting means which transmits the collected travel environment information to an information center installed in the outside when the environment change judgement means judges the travel environment has changed.

In the above travel environment information collecting device according to the present invention, it is preferable that the travel environment information collected by the collecting means includes at least one of, for example, traffic jamming information, road condition information and weather information. Still further, the travel environment information collecting device according to the present invention further comprises a position measurement means which measures the position of the vehicle concerned and wherein the travel environment information collected by the collecting means includes position information with respect to the position where the travel environment information is collected and time information with regard to the time when the travel environment information is collected.

Further, a travel environment information collecting device mounted on a vehicle according to the present invention which achieves the above objects comprises: a position measuring means which measures the position of the vehicle concerned; a traffic jam information collecting means which collects traffic jam information representing whether the road on which the vehicle concerned is now travelling is traffic-jamming; and a transmitting means which transmits the traffic jam information and the position information representing the position of the vehicle concerned which is measured by the position measurement means to an information center installed in the outside, when the traffic jam information collected by the traffic jam information collecting means changes from non-traffic jamming to traffic jamming.

Further, a travel environment information collecting device mounted on a vehicle according to the present invention which achieves the above objects comprises: a collecting means which collects travel environment information of a road on which the vehicle concerned is travelling; a transmitting means which transmits an information retrieval request to an information center installed in the outside of the vehicle concerned; and a receiving means which receives answer information with respect to the information retrieval request being transmitted from the information center, wherein the transmitting means transmits the travel environment information collected by the collecting means together with the information retrieval request to the information center, and further the travel environment information collecting device may further comprise a transmission control means which limits transmitting information volume of the travel environment information so that the transmission of the travel environment information collected by the collecting means is completed until the reception of the answer information with regard to the information retrieval request being transmitted from the information center is completed.

Still further, an information providing system comprising a travel environment information collecting device mounted on a vehicle which collects information relating to travel environment of a road on which the vehicle concerned is travelling and an information center which stores information relating to travel environment as well as provides the stored travel environment information to vehicles according to the present invention which achieves the above objects, is characterized in that the travel environment information collecting device comprises: a collecting means which collects travel environment information of the road on which the vehicle concerned is now travelling; a receiving means which receives travel environment information being transmitted from the information center; a judgement means which judges whether a processing of updating or new generation for a part of the received travel environment information is necessary by making use the collected travel environment information; and a transmitting means which transmits the travel environment information collected by the collecting means and to be used for the concerned processing to the information center when the judgement means judges that either the updating processing or the new generation processing is necessary, and in that the information center comprises: a memory means which stores the travel environment information; a transmitting means at the side of the information center which transmits the stored travel environment information a receiving means at the side of the information center which receives the travel environment information being transmitted from the travel environment information collecting device; and an updating means which updates or newly generates at least a part of the travel environment information stored in the memory means by making use of the received travel environment information.

BRIEF DESCRIPTION OF THE DRAWINGS

FIG. 1 is an explanatory view showing a system structure example including a broadcasting type information providing system and a travel environment information collecting device according to the present invention;

FIG. 16 is a diagram showing another data format example of travel environment information for every link in FIG. 15(a).

DETAILED DESCRIPTION OF THE PREFERRED EMBODIMENTS

Figure 2:
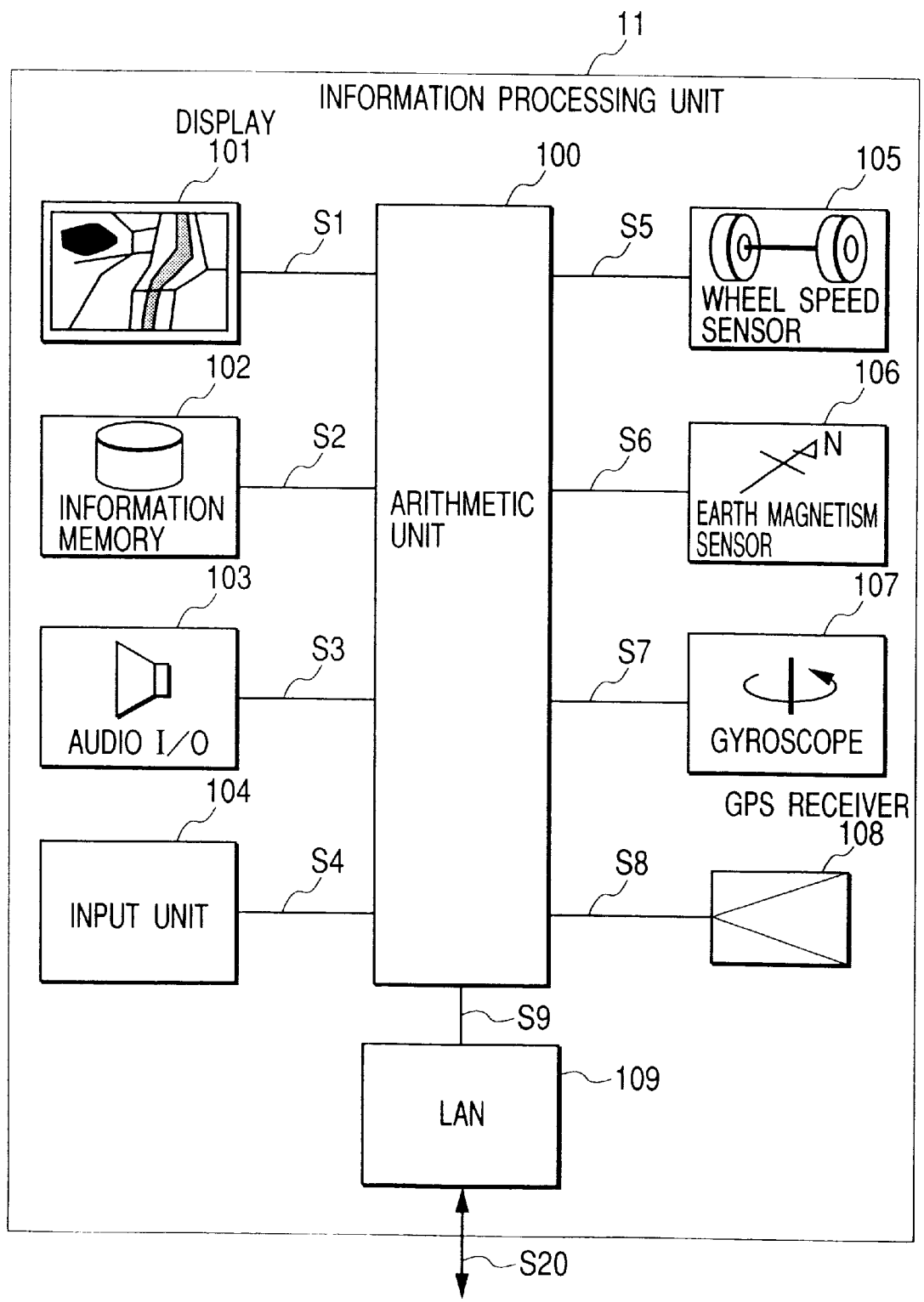
FIG. 2 is a block diagram showing a structural example of functional processing blocks for an information processing device in the system shown in FIG. 1.

Hereinbelow, an embodiment of a broadcasting type information providing system and a travel environment information collecting device according to the present invention will be explained with reference to the drawings.

FIG. 1 shows an outline of a broadcasting type information providing system and a travel environment information collecting device in which information stored in an information providing center 21 is transmitted to a moving body 10 via a communication line 20 or a broadcasting station 22 and the information is received either by a bidirectional communication unit 13 or by broadcast signal receiving unit 14 mounted on the moving body 10 and is processed into a desired information by an information processing unit 11 to present a user, the travel environment information collecting device to be mounted on the moving body 10 is constituted by the information processing unit 11, a surrounding environment analysis unit 12, the bidirectional communication unit 13 and the broadcasting signal receiving unit 14, and collects traffic environment information, and transmits the collected traffic environment information to the information providing center 21 via the communication line 20 as well as receives information stored in the information providing center 21 and being transmitted via the broadcasting station 22 or the communication line 20.

At first, the broadcasting type information providing system according to the present invention will be explained.

One of information which a user in a moving body most requires is road environment information such as traffic jamming or non-traffic jamming, information of existence or non-existence of an obstacle on a road and road surface condition. One of methods of providing such road environment information to a user as has been proposed is performed in such a manner that the road environment information is transmitted to the user through a series of steps including collecting information via the moving body which is treated as one of sensors, transmitting the collected information to the side of the information center and editing the received road environment information.

Now such processing contents will be explained in detail. The moving body 10 collects traffic environment information in the road route along which the vehicle concerned has travelled by making use of the information processing unit 11 and the surrounding environment analysis unit 12. Information obtained by the information processing unit 11 includes a travelling time required for passing through a predetermined road link through which the vehicle concerned has travelled and the maximum speed information therethrough, and the information obtained by the surrounding environment analysis unit 12 which is constituted by such as a camera and radar includes obstacle information which is obtained by extracting an outline of a body from an image information taken around the vehicle concerned and road surface condition information indicating wetting, snowfall and icing on the road surface.

These travel environment informations are transferred to the information center 21 via the communication line 20 by making use of the bidirectional communication unit 13 installed within the moving body 10. Examples of concrete bidirectional communication unit 13 include a cellular radio, PHS and satellite communication which permits bidirectional communication for public line, and MCA radio for exclusive line. The informations center 21 receives road environment informations from moving bodies which are travelling through a variety of positions, edits these informations in real time and thereby successively records road environment information of respective roads.

The road environment information edited in the information center 21 is transmitted to moving bodies 10 via the broadcasting station 22 or via the communication line 20. Further, the broadcasting station 22 unidirectionally communicates a large volume of data to many users existing in a board area, and concretely includes such as ground wave TV broadcasting, radio broadcasting, FM broadcasting, pager and satellite broadcasting.

FIG. 2 is a view showing functional processing blocks of the information processing unit 11 provided in the moving body 10. The information processing unit 11 according to the present embodiment comprises an arithmetic unit 100, a display 101, an information memory unit 102, an audio input and output unit 103, an input unit 104, a wheel speed sensor 105, an earth magnetism sensor 106, a gyroscope 107, a GPS receiving unit 108 and a LAN 109. Hereinbelow, the respective constituting elements in the information processing unit 11 will be explained.

The arithmetic unit 100 is a primary element which performs the following variety of processings, in that detecting the current position of the vehicle concerned based on sensor information outputted from the variety of sensors 105 through 108; reading map mesh data from the information memory unit 102 necessary for map display based on the obtained position information; developing the map data into graphics, thereafter displaying the graphics on the display 101 while superposing a current position marks thereon or after selecting an optimum route connecting between the destination commanded by the user and the current position, displaying the optimum route while superposing the same on the map displayed on the display 101 so as to navigate the user to the destination or after inquiring dynamic information required by the user to the information providing center 21, displaying obtained answer information on the display 101.

The display 101 is a unit for displaying graphics information generated in the arithmetic unit 100 and is constituted by such as a CRT and a liquid crystal display. Signals S1 between the arithmetic unit 100 and the display 101 are generally connected via such as RGB signals and NTSC (National Television System Committee) signals.

The information memory unit 102 is constituted by a large capacity memory medium such as CD-ROM and IC card and stores such as map mesh data necessary for map display and guidance information.

The input unit 104 is a unit which receives commands from a user, and is constituted by hard switches such as a scroll key and a reduced scale alternating key, joystick and a touch panel pasted on the display 101.

The sensors used for detecting a position for a moving body navigation are constituted by the wheel speed sensor 105 which measures a travelling distance from the product of the circumferential distance and the measured wheel rotation number, and further determines a curving route angle taken by the moving body 10 from the rotational number difference between paired wheels, the earth magnetism sensor 106 which detects magnetic field which the earth holds and detects azimuth to which the moving body 10 is directed, the gyroscope 107 such as an optical fiber gyroscope and a vibration type gyroscope which detects the rotation angle of the moving body 10 and the GPS receiving unit 108 which measures the current position, advancing speed and advancing direction of the moving body 10 through measurement of the distance between the moving body 10 and respective GPS satellites and changing rate thereof after receiving signals from more than three GPS satellites.

Further, the information processing unit 11 comprises the LAN (Local Area Network) 109 which permits communication between a variety of units within the moving body 10, namely the bidirectional communication unit 13, the broadcasting signal receiving unit 14 and the surrounding environment analysis unit 12. Through communication with these three unit the LAN 109 transfers required information from the user to the bidirectional communication unit 13 and operates to communicate obtained answer information either from the broadcasting signal receiving unit 14 or the bidirectional communication unit 13. Further, the bidirectional communication unit 13 is required to be able to perform data communication. Accordingly, if the data communication is not supported because of analogue system, the data communication is to be performed through provision of a modem.

Figure 3:
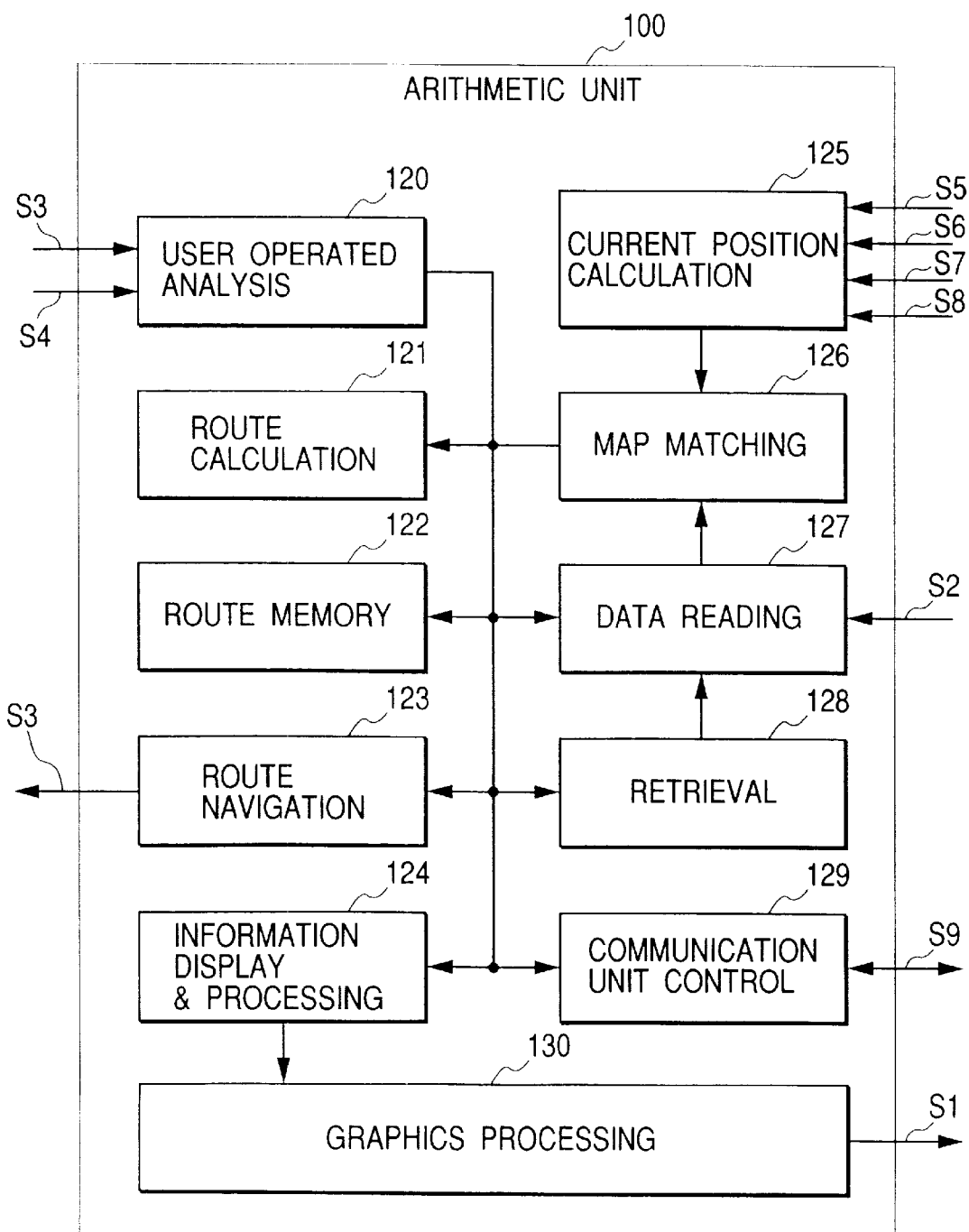
FIG. 3 is an explanatory view showing a structural example of processing blocks provided in an arithmetic unit shown in FIG. 2.

FIG. 3 is a view showing a structural example of functional processing blocks provided in the arithmetic unit 100.

The arithmetic unit 100 according to the present embodiment comprises a user operated analysis means 120, a route calculating means 121, a route memory means 122, a route navigating means 123, an information display and processing means 124, a current position calculating means 125, a map matching means 126, a data reading means 127, a retrieval means 128, a communication device control means 129 and a graphics processing means 130. Hereinbelow, the respective elements will be explained.

The current position calculating means 125 performs the following processings, in that by making use of the distance data and the angle data which are obtained as the result of respective integration of vehicle speed pulse data S5 measured by the wheel speed sensor 105 and the angular acceleration speed data S7 measured by the gyroscope 107 and by further integrating these data along the time axis, position (X', Y') after the moving body 10 has travelled from the initial position (X, Y) is calculated. Herein, in order to coincide the rotated angle of the moving body 10 with the advancing direction thereof, the respective angle data determined by integrating azimuth data S6 obtained from the earth magnetism sensor 106 and the angular acceleration speed data S7 obtained from the gyroscope 107 are mapped in one to one relation to correct the absolute azimuth representing the direction in which the moving body 10 is advancing. Further, when continuing the integration of the data obtained from the sensors, errors of the sensors are accumulated, therefore, a processing is performed at a predetermined period for canceling the accumulated errors based on the position data obtained from the GPS receiving unit 108, thereafter the current position information is outputted.

Since the above current position information contains the sensor errors, a map matching processing is performed by the map matching means 126 in order to further enhance the position detection accuracy. Such processing includes to read the road data contained in the map around the current position from the information memory unit 102 via the data reading means 127, to compare the travel route configuration obtained from the current position calculating means 125 and the road configuration and to match the current position to a road having the highest correlation with regard to their configurations. Through such map matching processing, the current position mostly coincides with a travel road, thereby the current position information can be outputted with a higher accuracy.

The route calculating means 121 retrieves links and nodes from the current position to a destination through a via position from the map data by making use of, for example, Dyquistra method, and the resultant route is stored in the route memory means 122. In this instance, when weight for the nodes is varied, a variety of routes can be obtained such as a route having the shortest distance between the two positions, a route having a possible shortest arrival time and a route incurring the lowest expense.

The route navigating means 123 compares the link and node information of the navigation route stored in the route memory means 122 with the current position information calculated by the current position calculating means 125 and the map matching means 126, and informs to the user by voices by making use of the audio input and output unit 103 whether the moving body 10 should go straight or turn right or left before passing through the crossing or informs the user a route by generating a diagram of the crossing to be navigated by making use of the information display and processing means 124 and by superposing a navigation arrow thereon.

The user operated analysis means 120 receives a request of the user via the input unit 104, analyzes the request and controls the respective functional blocks so as to execute the corresponding processings.

The data reading means 127 operates so as to read out such as map information and facility information stored in the information memory unit 102.

The retrieval means 128 controls the data reading means 127 and retrieves desired information, for example, position information such as facilities. associating information thereto and image information.

The communication device control means 129 operates to control and communicate via the LAN 109 with the bidirectional communication unit 113 and the broadcasting signal receiving unit 14 mounted on the moving body 10 and to read the information received thereby.

The information display and processing means 124 generates graphics drawings command for drawing map picture image, retrieval picture image and output picture image of the retrieval result and transfers the same to the graphics processing means 130.

The graphics processing means 130 executes the display processing by receiving the drawing command generated by the information display and processing means 124, by developing the same into picture image on a frame memory and by transferring the same to the display 101.

Now, some of the processing examples will be explained with reference to FIG. 3. For example, when it is assumed that the user commands an execution of the retrieval processing on information at a specific position, in this instance one of the following two processings is executed.

The first processing case is that the answer information with respect to the retrieval request is judged to exist in the information memory unit 102, namely in the moving body 10. Such processing contents will be explained hereinbelow.

The user operated analysis means 120 transfers data to the information display and processing means 124 and the graphics processing means 130 so as to display the retrieved picture image on the display 101. The user inputs desiring retrieval contents based on the display image through such as the touch panel and the joy stick provided in the input unit 104, and judges the retrieved contents with the designated position. Further, for the reception of the retrieval contents the voice synthesizing and voice recognizing functions provided for the audio input and output unit 103 can be used. In this instance, the voice synthesizing function is caused to voice, for example, "Tell me the retrieval contents" and the answer voice of the user in response thereto is analyzed by making use of the voice recognizing function.

The retrieval contents are transferred to the retrieval means 128, and the retrieval means 128 controls the data reading means 127 and retrieves answer information corresponding to the request. The obtained answer information is transferred to the information display and processing means 124 in which the answer information is converted into image data permitting display on the display 101, thereby, the answer information is displayed on the display 101.

Now, the second processing case will be explained. In the above, the instance that the answer information with respect to the request exists in the moving body 10, however, the present case is performed when the answer information does not exist in the moving body 10.

The user operated analysis means 120 operates in the same manner as in the first processing case and fetches the retrieval contents. The retrieval contents are transferred to the retrieval means 128 which controls the data reading means 127 and retrieves answer information corresponding to the request, and when the retrieval means 128 judges that the answer information corresponding to the request is not recorded inside the information memory unit 102, namely inside the moving body 10, the request information is transferred to the communication device control means 129.

The communication device control means 129 connects communication from the bidirectional communication unit 13 via the LAN 109 to the information providing center 21 located outside the moving body 10 and transfers the request information thereto.

The answer information outputted from the information providing center 21 is returned to the moving body 10 by making use of the bidirectional communication or the digital broadcasting. When the answer information is returned via the bidirectional communication, the bidirectional communication unit 13 receives the same, and when the answer information is returned via the digital broadcasting, the broadcasting signal receiving unit 14 receives the same, and the received answer information is transferred to the communication device control means 129 via the LAN 109. The obtained answer information is transferred to the information display and processing means 124 in which the answer information is converted into image data permitting display on the display 101, thereby, the answer information is displayed on the display 101.

Figure 4:
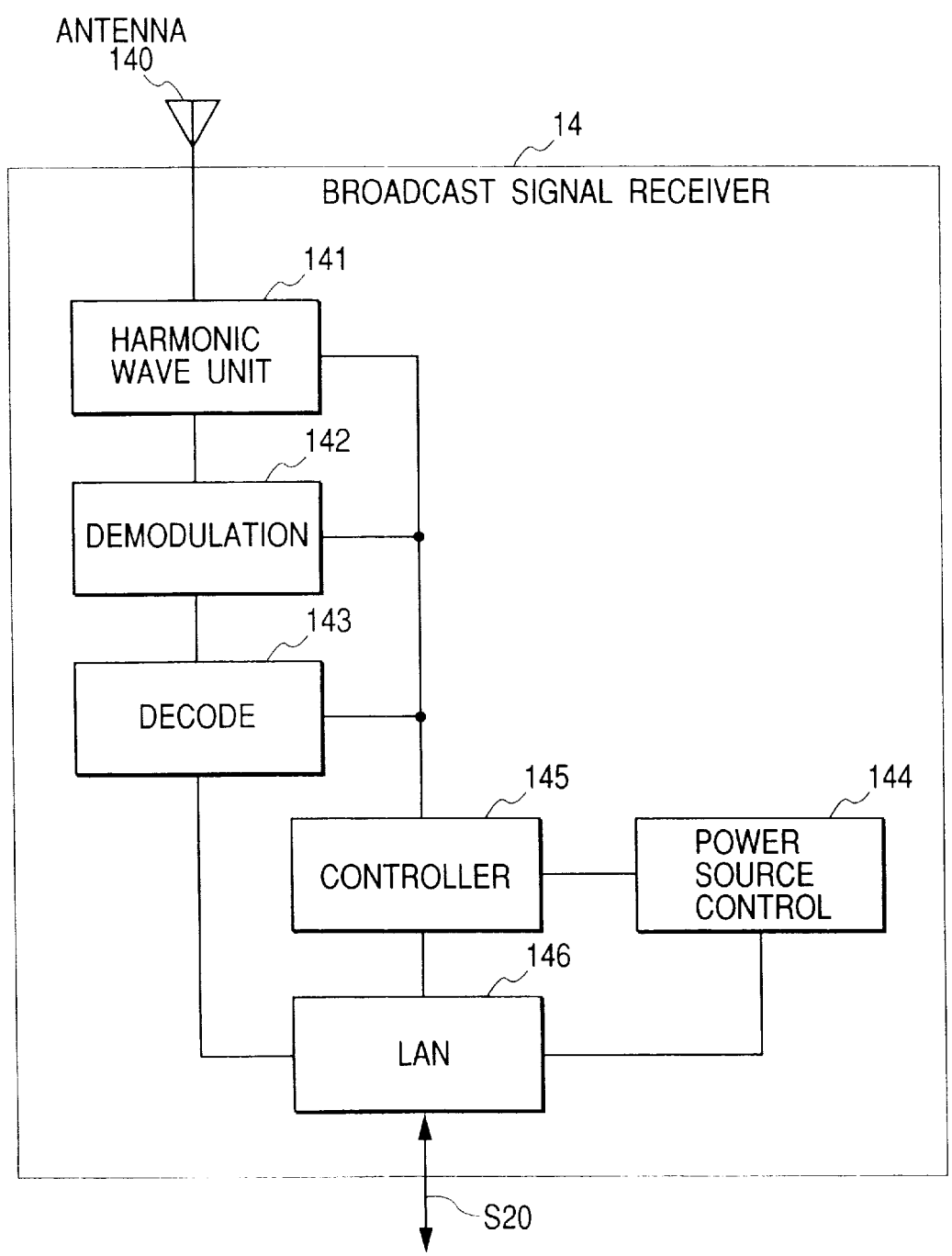
FIG. 4 is an explanatory view showing a structural example of a broadcast signal receiving device as shown in FIG. 1.

FIG. 4 is a block diagram showing a structural example of the broadcasting signal receiving unit 14. The broadcasting signal receiving unit 14 according to the present embodiment comprises a harmonic wave unit 141, a demodulation unit 142, a decoding unit 143, a power source control unit 144, a control unit 145 and a LAN 146. The respective elements will be explained hereinbelow.

The broadcasting signal receiving unit 14 is provided in the moving body 10, and has functions of receiving digital broadcasting radio waves which the broadcasting station transmits and of separating the received broadcasting radio waves into broadcasting directed to general listeners and the answer information directed to the receiver concerned.

At first, the harmonic wave unit 141 amplifies intensity of the radio wave signals caught by an antenna 140 and performs frequency conversion so that the frequency signals for the channel designated by the control unit 145 coincides with the intermediate frequency of the demodulation unit 142. The demodulation unit 142 demodulates the obtained broadcasting signals having the intermediate frequency and converts the same into digital signals. The decoding unit 143 separates the digital signals into broadcasting directed to the general public and the answer information to be transmitted toward the user who issued the request.

Further, there are a variety of methods for separating the answer information to be transmitted toward the user who issued the request. For example, one method is to set different IDs for user units and to separate the broadcasting information which coincides with the set ID, and another method is to dynamically determine ID in response to the information request and to separate the broadcasting information which coincide with the determined ID.

The information obtained in the decoding unit 143 is transferred to the information processing unit 11 via the LAN 146.

The power source control unit 144 makes and breaks the power source for the respective units in the broadcasting signal receiving unit 14 in accordance with the command of the information processing unit 11 and the control unit 145.

When the power source making is commanded from the information processing unit 11 via the LAN 146, the power source control unit 144 supplies the power to the respective units to move the same in to a stand-by state. Accordingly, even when the power source for the broadcasting signal receiving unit 14 is interrupted, the operation thereof can be initiated at a right timing, power saving of the system can be achieved.

The control unit 145 controls the respective units in the broadcasting signal receiving unit 14 in response to the command provided from the information processing unit 11. Namely, when the information processing unit 11 designates the channel through which the answer information is broadcasted, the control unit 145 controls the harmonic wave unit 141 to place the same under a condition to be able to received the concerned channel signals. Further, when the information processing unit 11 designates ID which identifies the answer information, the concerned ID is set at the decoding unit 143. Still further, when broadcasting completion judgement of the answer information is designated from the decoding unit 143, the control unit 145 commands power source interruption of the respective units to the power source control unit 144.

With the above structure, after receiving the answer information, the system operates so that the power source for the broadcasting signal receiving unit 14 is interrupted, therefore, power saving of the system is achieved.

The LAN 146 performs bidirectional communication with the respective units mounted on the moving body 10.

Figure 5:
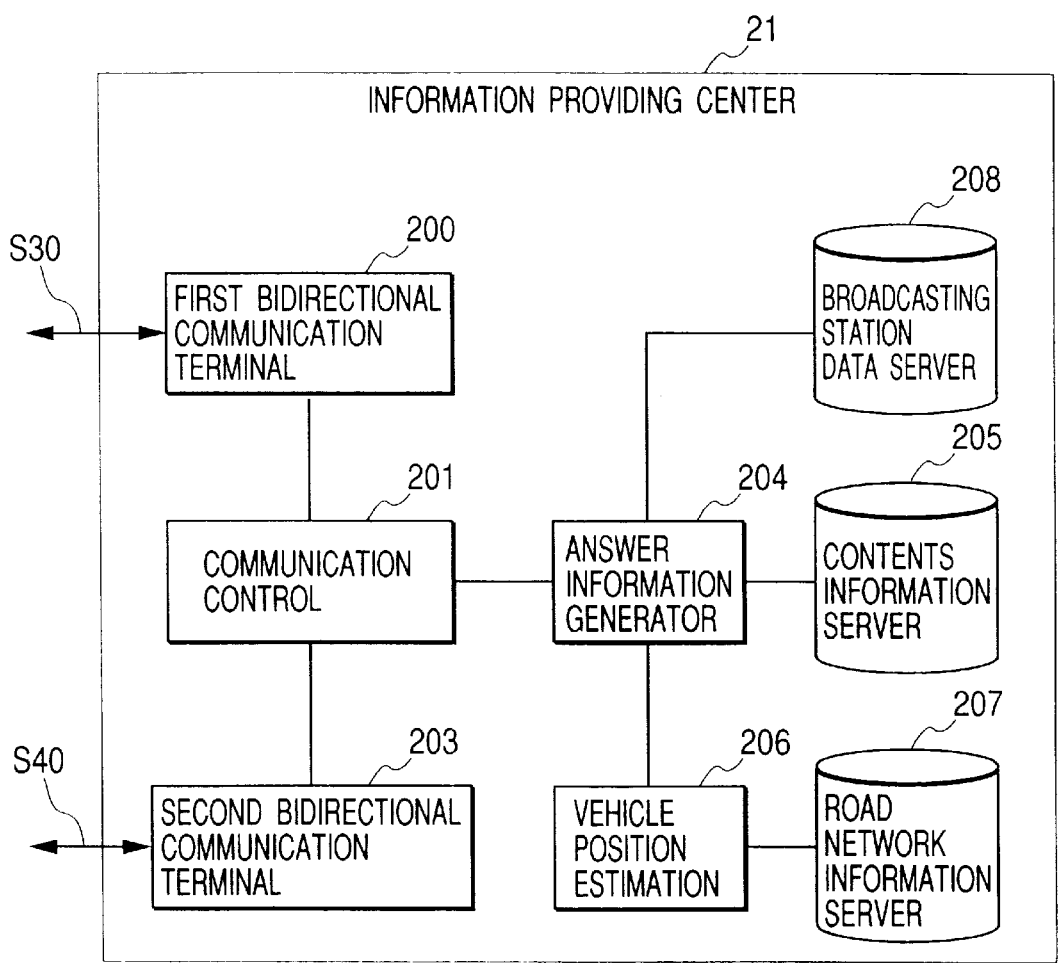
FIG. 5 is an explanatory view showing a structural example of an information providing center as shown in FIG. 1.

FIG. 5 is a block diagram showing a structural example of the information providing center 21. The information providing center 21 according to the present embodiment comprises a first bidirectional communication terminal 200, a communication control unit 201, a second bidirectional communication terminal 203, an answer information generating unit 204, a content information server 205, a vehicle position estimation unit 206, a road networks server 207 and a broadcasting data server 208. Hereinbelow, the respective elements will be explained.

The information providing center 21 operates to collect content information necessary for the moving body 10, to record the same in the servers, retrieve the servers in response to the request of the user, to generate answer information and to return the answer information to the user through an optimum communication route.

The first bidirectional communication terminal 200 is a unit for connecting communication line 20 and the information providing center 21 and is constituted by either by digital phone or by analogue phone. When constituting the first bidirectional communication terminal 200 by the analogue phone, the analogue signals are converted into digital signals by making use of a modem.

The communication control unit 201 is a unit for controlling data flow, transfers the request information transferred from the first bidirectional communication terminal 200 to the answer information generating unit 204, selects either the first bidirectional communication terminal 200 or the second bidirectional communication terminal 203 depending on the kinds of the answer information generated in the answer information generating unit 204 and transfers the answer information to the selected terminal and further performs communication interruption processing at the first bidirectional communication terminal 200.

The answer information generating unit 204 analyzes the contents of the request information, takes out necessary information from the content information server 205 and generates answer information as well as commands the communication control unit 201 a signal returning method depending on the kinds of the answer information. Further, the answer information generating unit 204 determines the position of the moving body 10 with reference to the current position information sent from the moving body 10, the estimated position of the moving body 10 outputted from the vehicle position estimation unit 206 or the position information of the base station to which the moving body 10 is connected through the communication line 20, and further determines a broadcasting station 22 which covers the position of the moving body 10 as its service area by retrieving the broadcasting station data server 208.

The content information server 205 is a unit which collects a variety of information including dynamic information and static information and stores the same. Although not illustrated in FIG. 5, the content information server 205 is connected such as exclusive line networks and internet for collecting external information and always stores the latest information.

The vehicle position estimation unit 206 operates to estimate a possible position of the moving body after a predetermined time has passed with reference to the current position information, the destination information, the via position information and the route information which are sent from the moving body 10. Further, for the estimation, the road information stored in the road network server 207, namely such as road link information and classified road information is used and the position of the moving body 10 is estimated based on average travelling time for the classified road. Further, through the use of traffic jam information stored in the content information server 205, a further accurate position estimation can be realized.

The second bidirectional communication terminal 203 is connected to communicate with the broadcasting station 22 selected by the answer information generating unit 204, and transfers the answer information. Further, the communication line to which the second bidirectional communication terminal 203 is connected can be either a public communication line network or an exclusive line.

Figure 6:
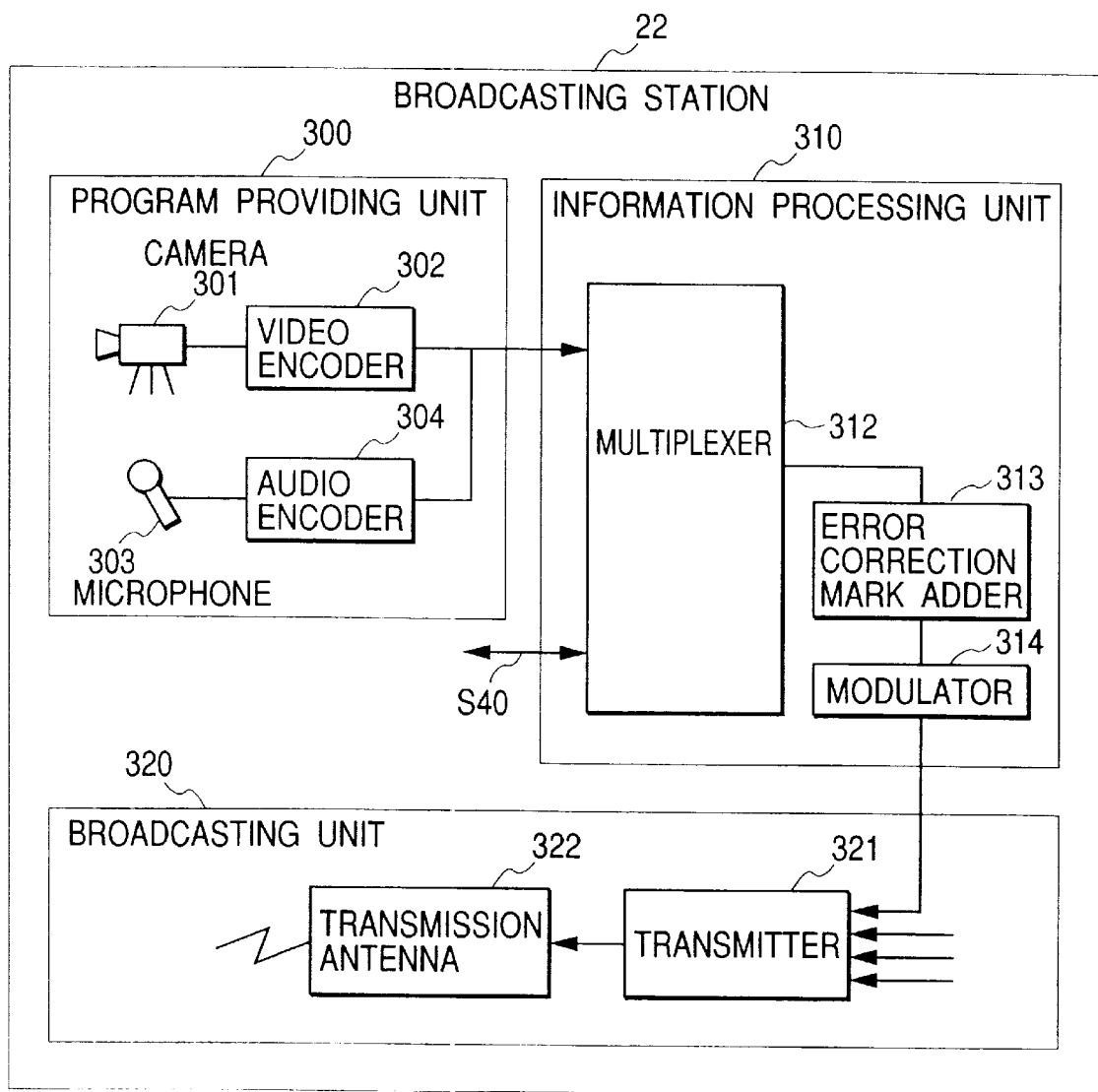
FIG. 6 is an explanatory view showing a structural example of a broadcasting station as shown in FIG. 1.

FIG. 6 is a block diagram showing a structural example of the broadcasting station 22. The broadcasting station 22 according to the present embodiment comprises a program providing unit 300 which produces programs to be broadcasted, an information processing unit 310 which multiplexes information distributed from such as the program providing unit 300 and the information providing center 21 and a broadcasting unit which transmits the processed information. Hereinbelow, the respective constituting elements will be explained.

The program providing unit 300 comprises a video camera 301 which converts screen image information into video signals, a microphone 303 which converts voices into audio signals, a video encoder 302 which converts the video signals and the audio signals into digital signals and compacts the converted digital signals for efficient transmission and an audio encoder 304.

In the information processing unit 310, a multiplexing unit 312 multiplexes digital signals being transmitted from one or more program providing unit 300 and the information providing center 21 into one packet to generate a bit stream. An error correction mark is added to the one packeted bit stream by an error correction mark adding unit 313 so as to permit correction of bit error due to external causes such as noises. The modulation unit 314 performs a high efficient and high error resistance digital modulation in view of the characteristics of the transmission path concerned.

In the broadcasting unit 320, one or more digital modulated signals are converted into harmonic wave signals by a transmitter 321, and the converted signals are broadcasted as a program through a transmission antenna 322 to region which the broadcasting station concerned covers as its service area.

Figure 7:
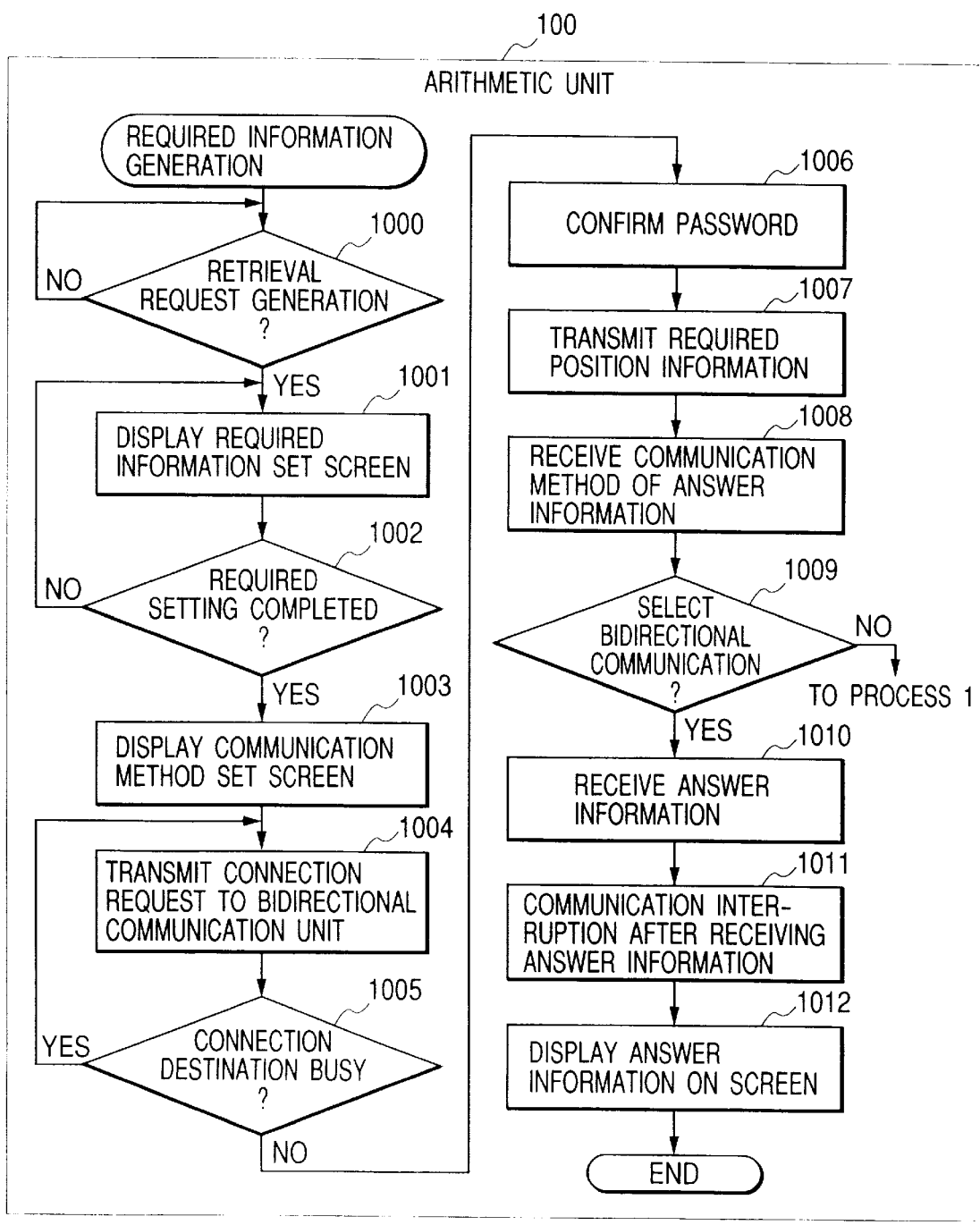
FIG. 7 is a flow chart showing a processing flow executed in the arithmetic unit as shown in FIG. 2.
Figure 8:
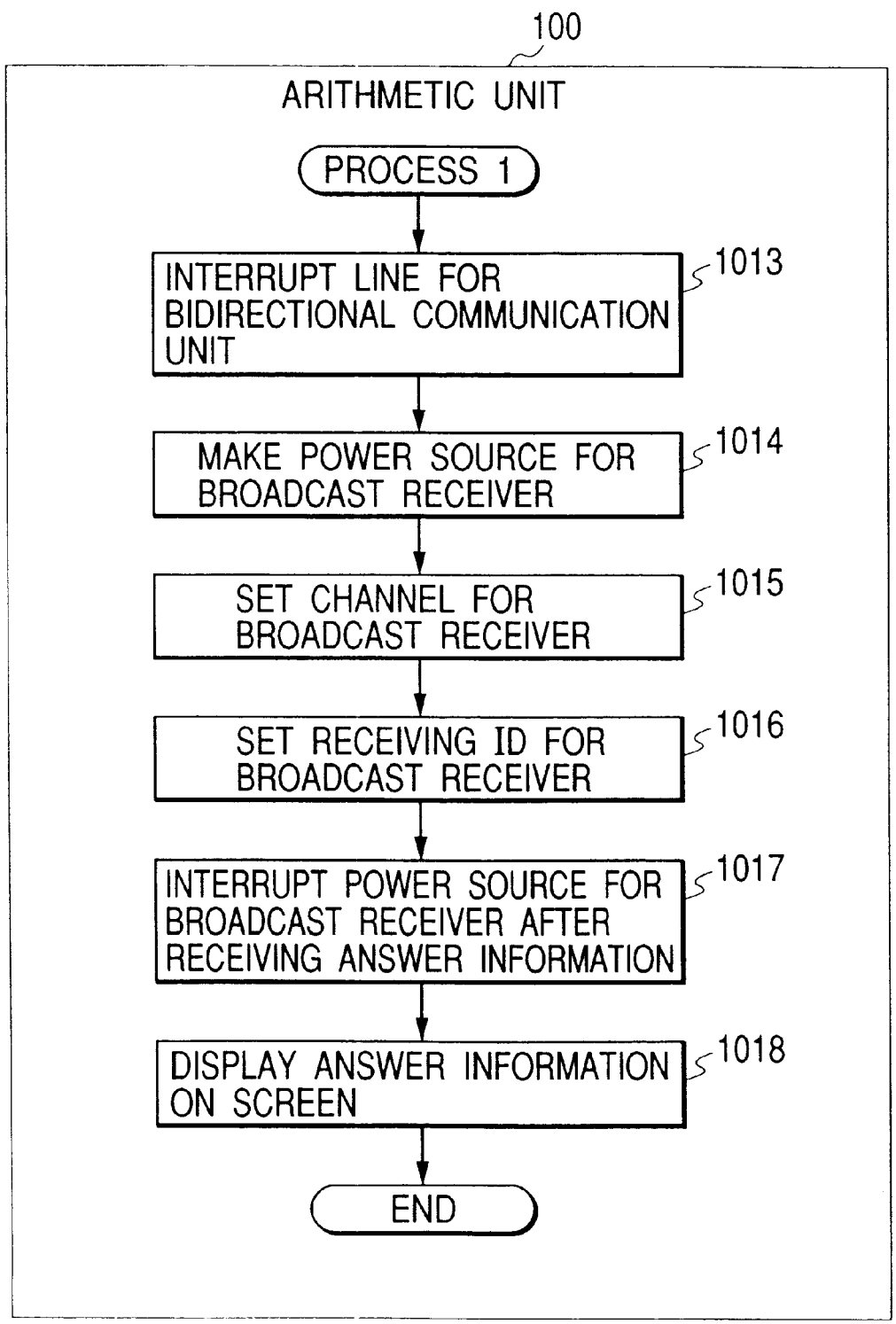
FIG. 8 is another flow chart showing another processing flow executed in the arithmetic unit as shown in FIG. 2.

FIGS. 7 and 8 are flow charts showing processing flows for dynamic information retrieval to be executed by the arithmetic unit 100 in the information processing unit 11 mounted on the moving body 10. Hereinbelow, the processings will be explained with reference to the flow charts.

Step 1000 monitors the user operated analysis means 120 and judges whether the user commands a retrieval request. When no request is commanded, the process returns to the original, and after a predetermined time has lapsed, generation of retrieval request is again checked. Further, in FIG. 6 a polling type processing flow is exemplified, however, the processing flow can be modified into an event driven type.

The judgement whether the request information is generated can be performed by monitoring such as the condition of an information retrieval switch in the outside of the moving body 10 on the menu image displayed on the display 101. On the other hand, such retrieval request can be issued from the user via the audio input and output unit 103. In this instance, required items are set in steps 1001 through 1003 through audio dialogue.

In step 1001, when it is judged that a retrieval request is issued from the user, a retrieval menu image for setting details of items to be retrieved is displayed on the display 101. Further, the retrieval menu image can be a nest structure type menu image which at first displays an outline of the menu and successively displays detailed information thereof.

For example, when retrieving information of a certain hotel, as the retrieval menu images at first an image setting a prefecture in which the hotel locates, then an image setting the class of the hotel, subsequently an image setting the specific name of the hotel are displayed, and finally if a specific hotel is designated, it is judged that a user request is set.

In step 1002, whether communication with the information providing center 21 is to be initiated is displayed on the screen in order to obtain answer information with respect to the retrieval request content set at step 1001, and a command from the user is waited. When the retrieval initiation is commanded, the process moves to the subsequent step. When resetting of the retrieval request content and addition for setting a plurality of retrieval request contents are commanded, the process again returns to step 1001 where the setting of the retrieval request content is executed.

In step 1003, the kinds of communication device mounted on the moving body 10 is confirmed by making use of the LAN 109, and if it is judged that no broadcasting signal receiving unit 14 is mounted on the moving body 10, it is set that the answer information is to be obtained via the bidirectional communication and the display of the communication method setting image is skipped. Thereby, displaying of non-selectable menu images is suppressed to thereby improve the easy handling of the system.

The display screen for the communication method setting displays the choices including "priority to bidirectional communication", "priority to broadcasting" and "select optimum communication route", and waits for user input. Herein, "priority to bidirectional communication" corresponds to a method of obtaining answer information via the bidirectional communication, "priority to broadcasting" corresponds to a method of obtaining answer information via the broadcasting and "select optimum communication route" corresponds to a method of obtaining answer with high speed and low cost while judging such as quality of the answer information and the communication line. The thus set communication line information is transferred to the information providing center 21 while being superposed on the request information.

In step 1004, a telephone number is transferred to the bidirectional communication unit 13 to make connection with the information providing center 21, and through dialing to the information providing center 21 via the communication line 20 by making use of the bidirectional communication unit 13 a communication connection is requested.

In step 1005, it is judged by checking the communication line 20 whether the connection with the first bidirectional communication terminal 200 within the information providing center 21 is made or not because of occupied terminal, and if being unabled to connect, the processes from step 1004 are again executed after a predetermined time has lapped. Further, it is displayed on the display screen that the connection to the information providing center 21 has failed.

In step 1006, an ID and pass words for logging in the information providing center 21 are sent out to confirm that the user of the moving body 10 is a client for the information providing center 21. If it is confirmed as the client, the process moves to the subsequent step. Further, if the ID and the pass words do not coincide with ones registered, the information is displayed and the communicated is interrupted.

In step 1007, the retrieval request information set by the user at step 1001r the communication method information set by the user at step 1003 and the current position information of the moving body 10 outputted from the current position calculating means 125 and the map matching means 126 are transferred to the information providing center 21. Further, if the broadcasting signal receiving unit 14 mounted on the moving body 10 is under operation, the signal receiving channel information of the broadcasting signal receiving unit 14 is in combination transferred thereto.

In step 1008, in response to the request transferred to the information providing center 21 at step 1007, the communication method of the answer information to be returned from the information providing center 21 is received. Available communication method of the answer information according to the present embodiment is either the bidirectional communication or the broadcasting.

In step 1009, in response to the communication method of the answer information obtained at step 1008 the information processing method following thereto is switched. When the bidirectional communication is not designated as the communication method of the answer information, the process moves to step 1013 in FIG. 8, and when the bidirectional communication is designated, the process moves to step 1010.

Step 1010 is activated when the answer information is returned via the bidirectional communication, namely via the bidirectional communication unit 13 and the answer information from the information providing center 21 with respect to the retrieval request information which the user requested is received.

In step 1011, when it is judged that the reception of the answer information is completed, the communication of which connection is initiated at step 1004 is interrupted.

Further, the communication line can be disconnected after judging that the information providing center 21 has disconnected the communication line concerned.

In step 1012, the answer information received at step 1010 is displayed together with the request information, thus the retrieval result is displayed for the user. Further, if the vehicle is travelling or if the user commands the information be provided via voices, the answer information is outputted through voices by making use of the audio input and output unit 103. Thus, the user can grasp the information being transmitted from the information providing center 21.

The step 1013 is activated, when the answer information is returned via the broadcasting, namely via the broadcasting signal receiving unit 14. Herein, after receiving information including the broadcasting station which transmits the concerned broadcasting, the broadcasting channel, the broadcast start scheduling time, the broadcast completion scheduling time, the answer information data volume and the ID and pass words for obtaining the answer information to be transmitted from the broadcasting station from the bidirectional communication unit 13, the communication line for the bidirectional communication is disconnected.

Further, through the knowledge of the broadcast start scheduling time, time margin with respect to power source making for the broadcasting signal receiving unit 14 and timing of channel change-over can be recognized. Further, through the knowledge of the broadcasting completion scheduling time, it is grasped whether the reception of the answer information through the broadcasting is normally completed. Namely, if even after the broadcasting completion scheduling time no answer information is obtained, it is judged normal information reception was failed, and the system is again controlled so as to request information to the information providing center 21.

In step 1014, it is confirmed whether the broadcasting signal receiving unit 14 is under operation, if not operating, a command for making the power source is transferred via the LAN 109 to the power source control unit 144 in the broadcasting signal receiving unit 14 to activate the same. The broadcasting signal receiving unit 14 can be activated earlier by a predetermined margin time than the broadcasting start scheduling time. If the system is constituted in this manner, the broadcasting signal receiving unit 14 can be initiated at a proper timing even if the power source therefor is disconnected which achieves power saving for the system.

In step 1015, information with respect to the broadcasting station which transmits the broadcasting received at step 1013 and the broadcasting channel thereof is transferred via the LAN 109 to the control unit 145 in the broadcasting signal receiving unit 14. According to these information, the control unit 145 sets the signal receiving channel for the harmonic wave unit 141.

In step 1016, among the broadcasting signals received at step 1013 information including such as ID, pass words for obtaining the answer information and answer information data volume is transferred via the LAN 109 to the control unit 145 in the broadcasting signal receiving unit 14. According to these informations the control unit 145 sets the ID and the pass words in order to decode the objective answer information at the decoding unit 143. Further, the answer information data volume is used for judging whether the answer information is correctly transmitted through comparison with the broadcasting information data volume.

In step 1017, when the reception of the broadcasting answer information is completed, the answer information is transferred to the information processing unit 11, and when the broadcasting signal receiving channel is changed over at step 1015, the signal receiving channel is returned to the previous channel.

Further, in step 1017, under the condition that the power source for the broadcasting signal receiving unit 14 was made in step 1014, a command for disconnecting the power source for the broadcasting signal receiving unit 14 is transferred via the LAN 109 to the power source control unit 144 in the broadcasting signal receiving unit 14 to deactivated the same. With this structure, the broadcasting signal receiving unit 14 can be initiated at a proper timing even if the power source therefor is disconnected which achieves power saving for the system.

In step 1018, the answer information received at step 1017 is displayed together with the request information, thus the retrieval result is displayed for the user. Further, if the vehicle is travelling or if the user commands the information be provided via voices, the answer information is outputted through voices by making use of the audio input and output unit 103. Thus, the user can grasp the information being transmitted from the information providing center 21.

Figure 9:
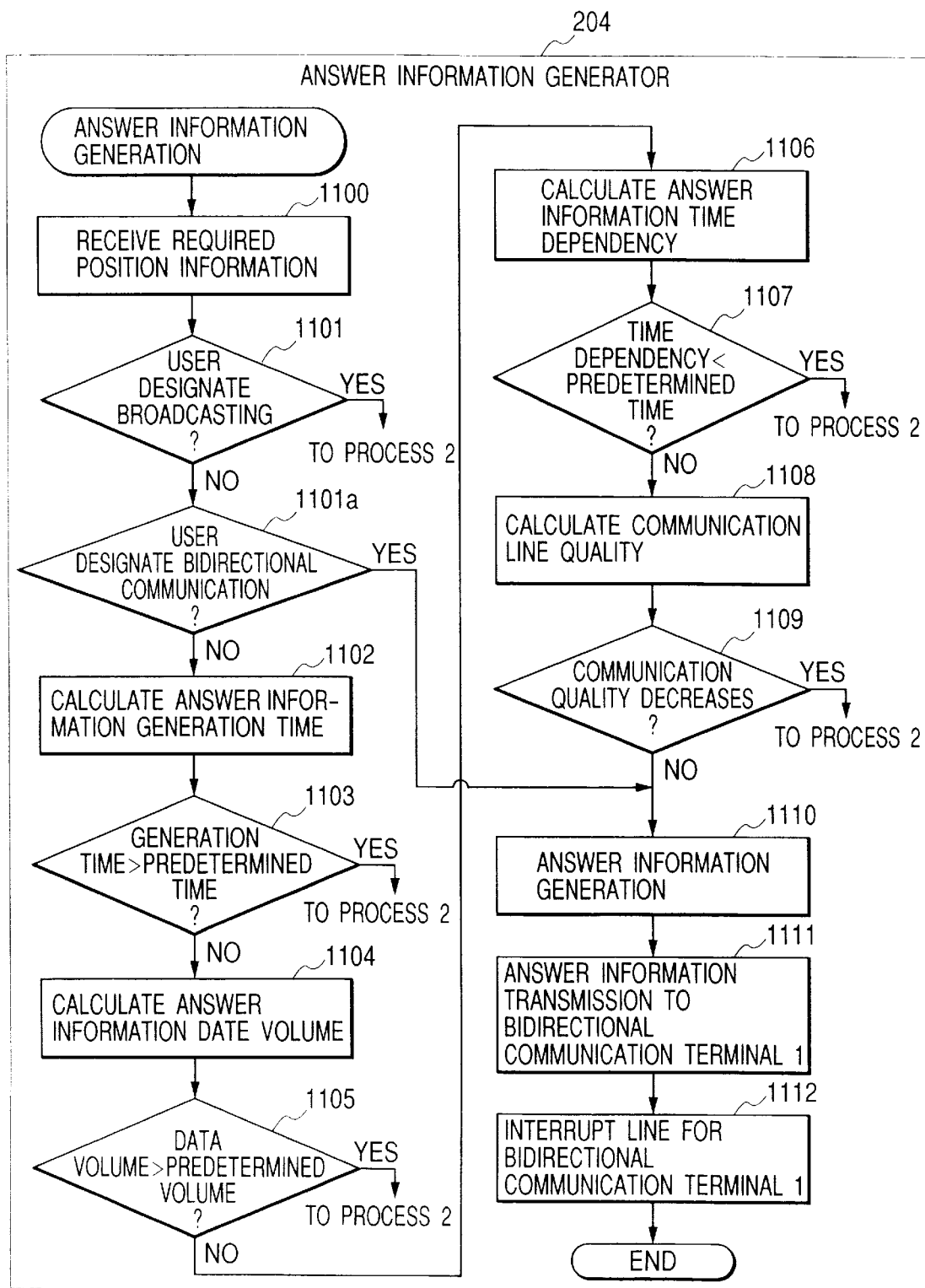
FIG. 9 is a flow chart showing a processing flow executed in the answer information generating device as shown in FIG. 5.
Figure 10:
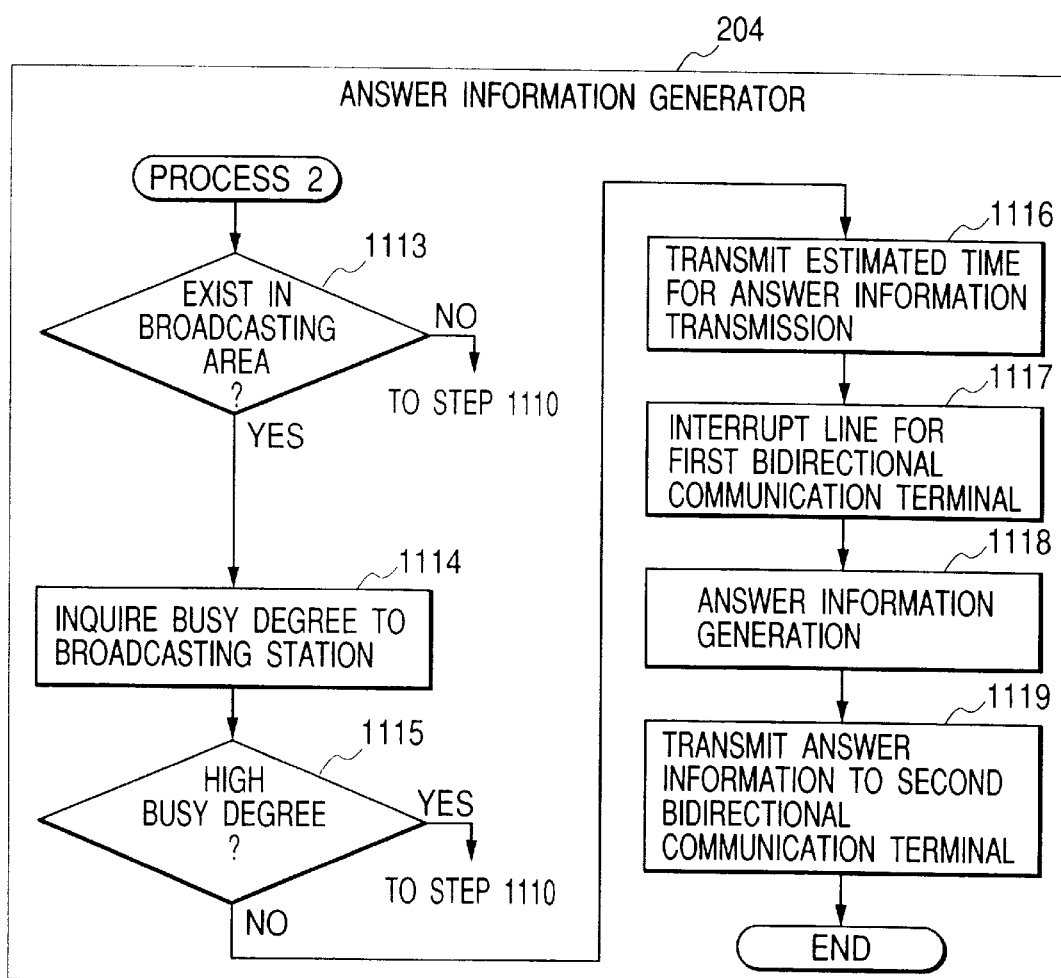
FIG. 10 is another flow chart showing a processing flow executed in the answer information generating device as shown in FIG. 5.

FIGS. 9 and 10 are flow charts showing processing flows for the communication line setting executed in the answer information generating unit 204 in the information providing center 21. Hereinbelow, the processings will be explained with reference to the flow charts.

In step 1100, the retrieval request information and the communication method information set by the user which are transmitted from the bidirectional communication unit 13 for the moving body 10 via the communication line 20 and the first bidirectional communication terminal 200 to the information providing center 21, and the current position information of the moving body 10 outputted from the current position calculating means 125 and the map matching means 126 are received and stored inside the answer information generating unit 204.

When the moving body 10 is connected via radio waves with a radio wave ground station constituting a moving body communication network, the position information of the moving body 10 can be a rough position of the moving body 10 which is obtained by identifying a base station being connected with the moving body 10.

In steps 1101 and 1101a, the communication method information stored in step 1100 is analyzed to determine the subsequent processing method. Namely, when "priority to broadcasting" is selected, the process moves to step 1113 in the process 2 as shown in FIG. 10, when "priority to bidirectional communication" is selected, the process moves to step 1110 and when "select optimum communication route" is selected, the process moves to step 1102.

In step 1102, necessary time is estimated for generating answer information with respect to the retrieval request from the user. The necessary time for generating the answer information is determined by integrating such a time including time for accessing to the content information server 205 and for taking out necessary information for generating the answer information, time for accessing to an external data base and for collecting the necessary data when necessary information can not be obtained from the content information server 205 and time for shaping the answer information into a predetermined format.

In step 1103, when it is judged that it takes time more than a predetermined time for the data preparation in view of the necessary time for generating the answer information which was obtained at step 1102, the process moves to step 1113, namely the system operates to move to the process of receiving the answer information through broadcasting. This is because when the time required for the preparation is long, waste time in which no data exchange is performed may be caused for the bidirectional communication.

With the provision of the above function the communication time for the bidirectional communication is shortened which can reduces a possible communication cost.

In step 1104, the answer information data volume with respect to the retrieval request from the user is estimated. The answer information data volume is a total volume of such as image information, audio information and animation information included in the answer information.

In step 1105, when it is judged that the data volume exceeds a predetermined volume in view of the answer information data volume which was obtained at step 1102, the process moves to step 1113, namely the system operates to move to the process of receiving the answer information through broadcasting. This is because when the data volume of the answer information becomes significant, with the bidirectional communication of which communication line data transferring speed is low the communication time prolongs and the communication cost therethrough increases, moreover, it is highly possible that the communication can be disconnected at the midway in connection with the movement of the moving body 10.

With the use of the present function, when the volume of the answer information is significant, the broadcasting of which data transferring speed is high is selected, therefore, the data can be transferred to the moving body 10 from the information providing center 21 in shorter time with a low cost and a higher probability.

In step 1106, the time dependency of the answer information with respect to the retrieval request from the user is calculated. The time dependency of the answer information relates to time limit within which the answer is necessitated, in other words, whether the answer information is required by the user to be transmitted immediately or the answer information can be transmitted after a predetermined time. For example, such as the road crowdedness information near the destination is non-urgent information, because such will be necessary when the moving body 10 approaches to the destination, however, the road crowdedness information near the current position of the vehicle concerned is desired to be obtained immediately. The time dependency is expressed by using parameters such as time.

In step 1107, when it is judged that the time dependency of the answer information is low in view of the time dependency of the answer information which was obtained at step 1102, namely, the urgency of the answer information is low, the process moves to step 1113, namely, the system operates to move to the process of receiving the answer information through the broadcasting. This is because if the information with low urgency is transferred via the bidirectional communication, the communication cost increases.

Through the use of the present function, when the urgency of the information is low, the broadcasting of which communication cost is low can be selected, therefore, the data can be transferred to the moving body 10 from the information providing center 21 with a low cost and a higher probability.

In step 1108, the communication line quality of the communication line 20 is calculated. The quality of a communication line is determined by the ratio of rated data transferring speed of the communication line concerned and data transferring speed during data transference. A method of determining data transferring speed is generally used in which while checking data transferring error by making use of such as parity the data transferring speed is reduced until no errors are generated during the data transference. Further, the data transferring speed can be determined by a method in which the data transferring speed is calculated from effective data transferring volume excluding data transference errors.

In step 1109, when it is judged that the quality of the communication line with respect to the rated one is lower than a predetermined quality in view of the communication line quality obtained at step 1108, the process moves to step 1113, namely, the system operates to move to the process of receiving the answer information through broadcasting. This is because when a communication route having a low communication line quality is used, the communication time is prolonged and resultantly the communication cost increases.

Through the use of the present function, when the quality of communication line is deteriorated, the broadcasting of which communication quality is high can be selected, therefore, the data can be transferred to the moving body 10 from the information providing center 21 with a low cost and a higher probability.

Step 1110 is activated when the answer information is determined to be transmitted via the bidirectional communication after completed the above step, based on the retrieval request set by the user and stored at step 1100, the content information server necessary for generating the answer information is taken out and the answer information is shaped to meet the predetermined format.

In step 1111, the answer information generated step 1110 is returned via the first bidirectional communication terminal 200 and the communication line 20 to the bidirectional communication unit 13 mounted on the moving body 10.

In step 1112, the communication line connected to the first bidirectional communication terminal 200 is disconnected under the condition that the transmission of the answer information has completed.

Step 1113 as shown in FIG. 10 is activated when the answer information is returned via the broadcasting and it is judged in which broadcasting station service area the moving body 10 is now located through comparison between the current position information of the moving body 10 stored at step 1100 and service area of respective broadcasting stations stored in the broadcasting station data server 208. When it is judged that the moving body 10 is located outside of the service areas of any broadcasting stations, the answer information can not be returned via the broadcasting, therefore, the process shifts to step 1110 where the answer information is returned via the bidirectional communication.

Further, when the answer information is to be received via the broadcasting after a predetermined time when the position information is received from the moving body 10, the system operates to select a specific broadcasting station 22 to cause to broadcast the answer information based on the estimated position information of the moving body 10 at the very moment which is estimated by the vehicle position estimating means 206.

In step 1114, it is inquired to the broadcasting station 22 which covers the estimated position where the moving body 10 may locate as its service area whether there remains a line capacity enough to superpose the answer information in the broadcasting signals until a predetermined time from the present moment. The predetermined time can be set depending on the time dependency of the answer information, in that when it is required to return the answer information in short time, the predetermined time is set short, and when the time dependency is low, the predetermined time is set long. Further, the second bidirectional communication terminal 203 is used for the inquiring.

In step 1115, when it is determined that there is no enough line capacity with respect to the inquiry at step 1114, the process moves to step 1110 in which the answer information is returned via the bidirectional communication. On the other hand, when it is judged that there is enough line capacity, the process moves to step 1116 in which the answer information is returned via the broadcasting.

In step 1116, information including the broadcasting station transmitting the broadcasting, the broadcasting channel, the broadcasting start scheduling time, the broadcasting end scheduling time, the answer information data volume and the ID and pass words for obtaining the answer information to be transmitted via the broadcasting is determined, and the information is transmitted via the bidirectional communication means including the first bidirectional communication terminal 20, the communication line 20 and the bidirectional communication unit 13 to the moving body 10.

With regard to the broadcasting station 22 for transmitting the broadcasting, a specific broadcasting station which covers the region where the moving body 10 now located as its service area is selected based on the information relating to the service areas of the respective broadcasting stations which is stored in the broadcasting station data server 208. With regard to the broadcasting channel, the channel through which broadcasting signals are now being received by the broadcasting signal receiving unit 14 mounted on the moving body 10 is selected with priority. The broadcasting start scheduling time and the broadcasting end scheduling time are estimated based on crowdedness degree of the broadcasting signals. Herein, the crowdedness degree is, for example, calculated based on already reserved broadcasting data volume/maximum data volume of the broadcasting line when the answer information is broadcasted. Namely, the higher the crowdedness degree, the more the already reserved data volume, therefore, it is difficult to add broadcasting data lately.

In step 1117, the communication line connected to the first bidirectional communication terminal 200 is disconnected under the condition that the information communication at step 1116 is ended.

In step 1118, the content information server 205 is accessed based on the retrieval request set by the user and stored at step 1100 and the necessary information for generating the answer information is taken out, and the answer information is shaped into a predetermined format.

In step 1119, the answer information generated at step 1118, the channel information and the ID and pass words for obtaining the answer information to be received from the broadcasting are transmitted to the broadcasting station 22 of which service area cover the position of the moving body 10 by making use of the second bidirectional communication terminal 203.

The broadcasting station 22 broadcasts the answer information transmitted from the information providing center 21 while superposing the same on the general broadcasting. The broadcasting signal receiving unit 14 mounted on the moving body 10 receives the broadcasting signals and obtains the objective answer information through decoding the objective answer information.

The broadcasting type information providing system according to the present invention as has been explained hitherto operates to provide the answer information to the user, while selecting an optimum communication route and an optimum broadcasting station so that the answer information is transmitted from the information providing center to the moving body in high speed and with a low cost and with safety.

Further, according to the present invention, the broadcasting signal receiving unit provided in the moving body is designed to operate so that the power source is dynamically made or disconnected depending on existence or absence of the answer information transmission which contributes to lower the power consumption of the system.

Figure 11:
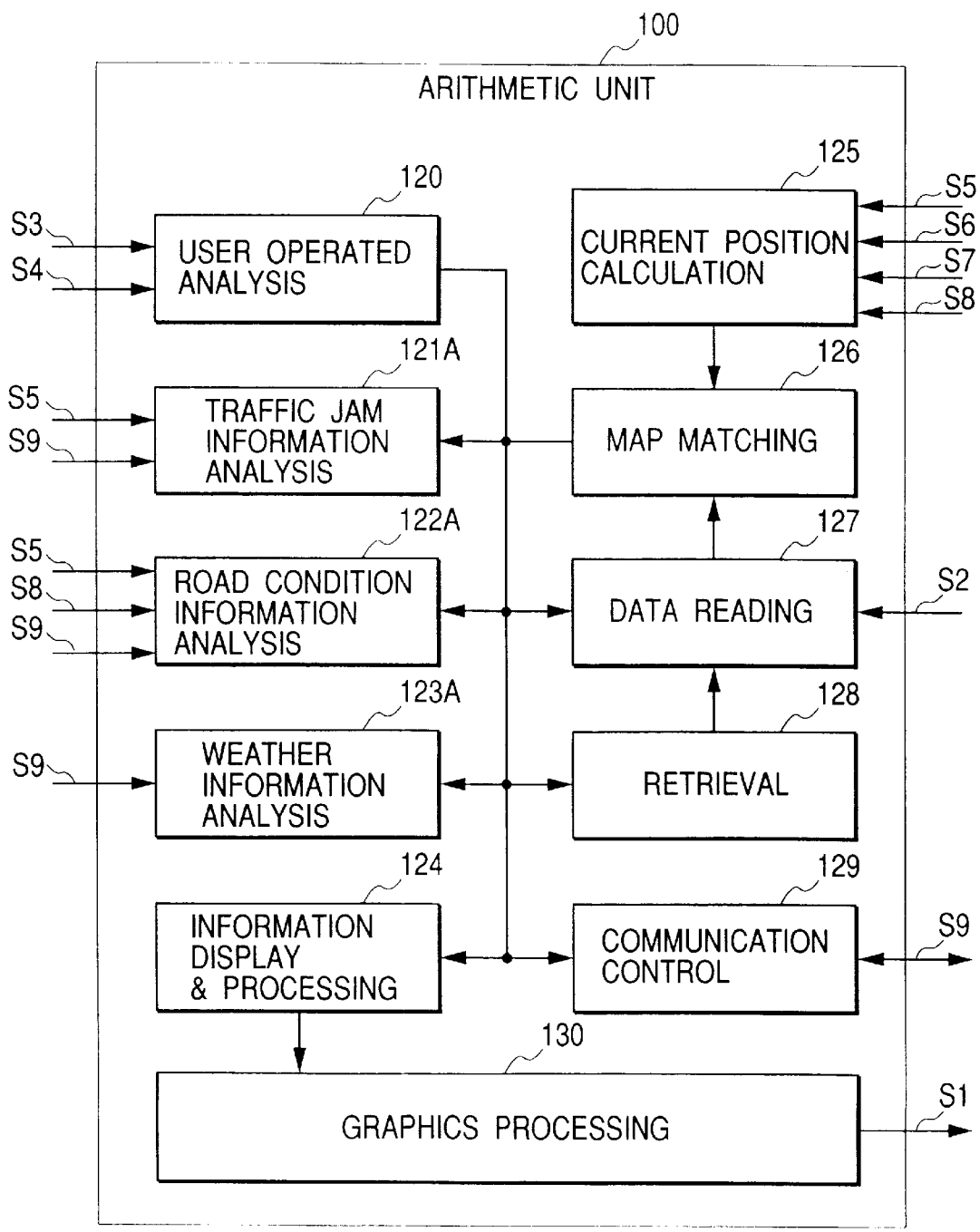
FIG. 11 is a block diagram showing another structural example of processing blocks provided in the arithmetic unit as shown in FIG. 2.

FIG. 11 is a block diagram showing another structural example of processing blocks provided in the arithmetic unit 100.

Hereinbelow, the respective elements will be explained.

The current position calculating means 125 performs the following processings, in that by making use of the distance data and the angle data which are obtained as the result of respective integration of vehicle speed pulse data S5 measured by the wheel speed sensor 105 and the angular acceleration speed data S7 measured by the gyroscope 107 and by further integrating these data along the time axis, position (X', Y') after the moving body 10 has traveled from the initial position (X, Y) is calculated. Herein, in order to coincide the rotated angle of the moving body 10 with the advancing direction thereof, the respective angle data determined by integrating azimuth data S6 obtained from the earth magnetism sensor 106 and the angular acceleration speed data S7 obtained from the gyroscope 107 are mapped in one to one relation to correct the absolute azimuth representing the direction in which the moving body 10 is advancing. Further, when continuing the integration of the data obtained from the sensors, errors of the sensors are accumulated, therefore, a processing is performed at a predetermined period for canceling the accumulated errors based on the position data obtained from the GPS receiving unit 108, thereafter the current position information is outputted.

Since the above current position information contains the sensor errors, a map matching processing is performed by the map matching means 126 in order to further enhance the position detection accuracy. Such processing includes to read the road data contained in the map around the current position from the information memory unit 102 via the data reading means 127, to compare the travel route configuration obtained from the current position calculating means 125 and the road configuration and to match the current position to a road having the highest correlation with regard to their configurations. Through such map matching processing, the current position mostly coincides with a travel road, thereby the current position information can be outputted with a higher accuracy.

A traffic jamming information analysis means 121A analyzes whether any traffic obstacles such as traffic jam are caused on the road through which now travelling or on the road through which has travelled based on the current position information outputted from the current position calculating means 125 and the map matching means 126.

In one of traffic jam discrimination methods, for example, an actual measured time for travelling a road link and an average travel time for the road link stored such as in the information memory unit 102 are compared and whether the actual measured time is more than a predetermined number of times of the average travel time is judged to determine traffic jam. Further, when the above predetermined number of times is divided into a plurality of numbers according to traffic jam levels, a further accurate traffic jam discrimination can be achieved. Still further, the average travel time can be determined based on information on the road class such as prefecture roads and national roads, lane number and road width which are used to determine the length of road and travel easiness.

In another traffic jam discrimination method, a traffic jam can be judged by making use of the maximum speed with which the moving body 10 has travelled through a predetermined road. In this instance, when the maximum speed is below a predetermined speed, it is judged that road is in a traffic jam.

In still another traffic jam discrimination method, images around the vehicle concerned are taken by the surrounding environment analysis unit 12 such as a camera and when relative speed of other vehicles travelling in the same direction as that of the vehicle concerned is below a predetermined value, it is judged that the road is in traffic jam.

The road condition information analysis means 122A outputs a variety of information determined, for example, by extracting outlines of an object from an image taken by making use of image data taken around the vehicle concerned and from the road surface through the surrounding environment analysis unit 12 such as a camera. Through comparison of these informations in association with the movement of the moving body 10, it is judged whether the object is standstill or moving. By extracting a stationary object and discriminating the volume of the object it is judged whether there is an obstacle on the road.

Further, when the surrounding environment is observed stereoscopically, the relative distance from the position of the vehicle concerned to the obstacle and the direction thereto are recognized, an accurate position of the obstacle can be determined through combination of the position information of the vehicle concerned. Further, when taking images of the road surface if an image using a horizontal plane polarizing filter and an image not using the same are compared, information whether the road surface is wet or dry can be obtained. Still further, regardless to the existence of white lines on the road if such can not be recognized, it is judged that snow is accumulated on the road.

In the above, methods of analyzing the road condition information with the surrounding environment analysis unit 12 have been explained, however, further road condition information can be analyzed by making use of the wheel speed sensor 105 and the GPS receiver 108. The information to be analyzed here is a road slippery information which can be analyzed by comparing rotating conditions of driven wheels and of non-driven wheels. Namely, the driven wheels to which a driving force is transmitted applies forces for advancing and stopping through the wheel tires to the road by making use of the corresponding friction force, if the road surface becomes slippery condition because of snow, rain and icing, the slipping between the wheel tires and the road surface occurs due to spinning and wheel tire locking. On the other hand, the non-driven wheels to which no driven force is transmitted are totaled by inertia forces, therefore, assume a rotating speed corresponding to actual travel speed of the vehicle. Accordingly, if difference in the rotation number occurs between the driven wheels and non-driven wheels, it can be judged that the vehicle is travelling on a slippery road.

Further, based on the speed vector information outputted from the GPS receiver 108 an absolute speed of the vehicle can be measured. Accordingly, if a difference between the thus measured absolute speed information and the speed information calculated from the rotation number of the driven wheels is observed, it can be judged that the vehicle is travelling on a slippery road.

The weather information analysis means 123A judges whether the weather of the travelling road route is rain, snow or mist based on the resultant images taken around the vehicle concerned and from the road surface with the surrounding environment analysis unit 12. Further, the weather can be judged by the operating condition of such as a rain drops sensor, a temperature sensor and a wiper.

The user operated analysis means 120 receives a request of the user via the input unit 104, analyzes the request and controls the respective functional blocks so as to execute the corresponding processings. For example, when communicating with the information center 21 in order to obtain value added information required by the user, the desired retrieval request information, for example, position information, associating information and image information of such as facilities are transmitted via the communication unit 13 to the information center 21 through control of the communication control means 129. The information center 21 generates answer information in response to the retrieval request and transfers the answer information via the communication line 20 and the communication unit 13 to the moving body 10.

Now, these retrieval request information data volume in the communication between the moving body 10 and the information center 21 is mostly significantly small in comparison with the data volume of the retrieval result. Accordingly, during the waiting time before the retrieval result being outputted if the information relating to the road through which the vehicle concerned has travelled and being collected by the traffic jam information analysis means 121A, the road condition information analysis means 122A and the weather information analysis means 123A is transmitted together with the retrieval request information, real time road environment information can be transmitted to the information center 21 without increasing the communication line load for the sides of the user and the information center 21.

Further, it is preferable that the user can select whether the road environment information collected at the side of the moving body 10 be transmitted to the side of the information providing center 21. With this measure, the privacy of the user can be protected. Further, the road environment information collected by the moving body 10 can be transmitted from the moving body 10 to the information center 21 by makings use of time when the retrieved result is transmitted from the information center 21 to the moving body 10.

This measure is characterized in that during the interval when the retrieved result is being transmitted to the moving body 10, in other words, during the interval when the downwarding line is used, the upwarding line is generally not used, however, the road environment information is transmitted to the information center 21 via the generally non-used upwarding line. Accordingly, the road environment information can be transmitted without increasing any communication expense of the user.

Further, it is preferable to limit the data volume of the road environment information to be transmitted to a predetermined volume which can be transmitted until the transmission of the answer information is ended, more specifically the data volume of the road environment information is equal to or less than the data volume of the answer information when assuming that the data transferring speed of upward/downward lines is equal.

Further, when it is required to further limit the transmission data volume, it is preferable to selectively transmit the latest information with priority and to discard older information.

With this measure, like the above explained measure, real time road environment information can be transmitted to the information center 21 without increasing the communication line load for the sides of the user and the information center 21.

The information display and processing means 124 generates a graphic drawing command for drawing map picture image, retrieval picture image and output picture image of the retrieval result and transfers the same to the graphics processing means 130.

The graphics processing means 130 executes the display processing by receiving the drawing command generated by the information display and processing means 124, by developing the same into picture images on a frame memory and by transferring the same to the display 101.

Figure 12:
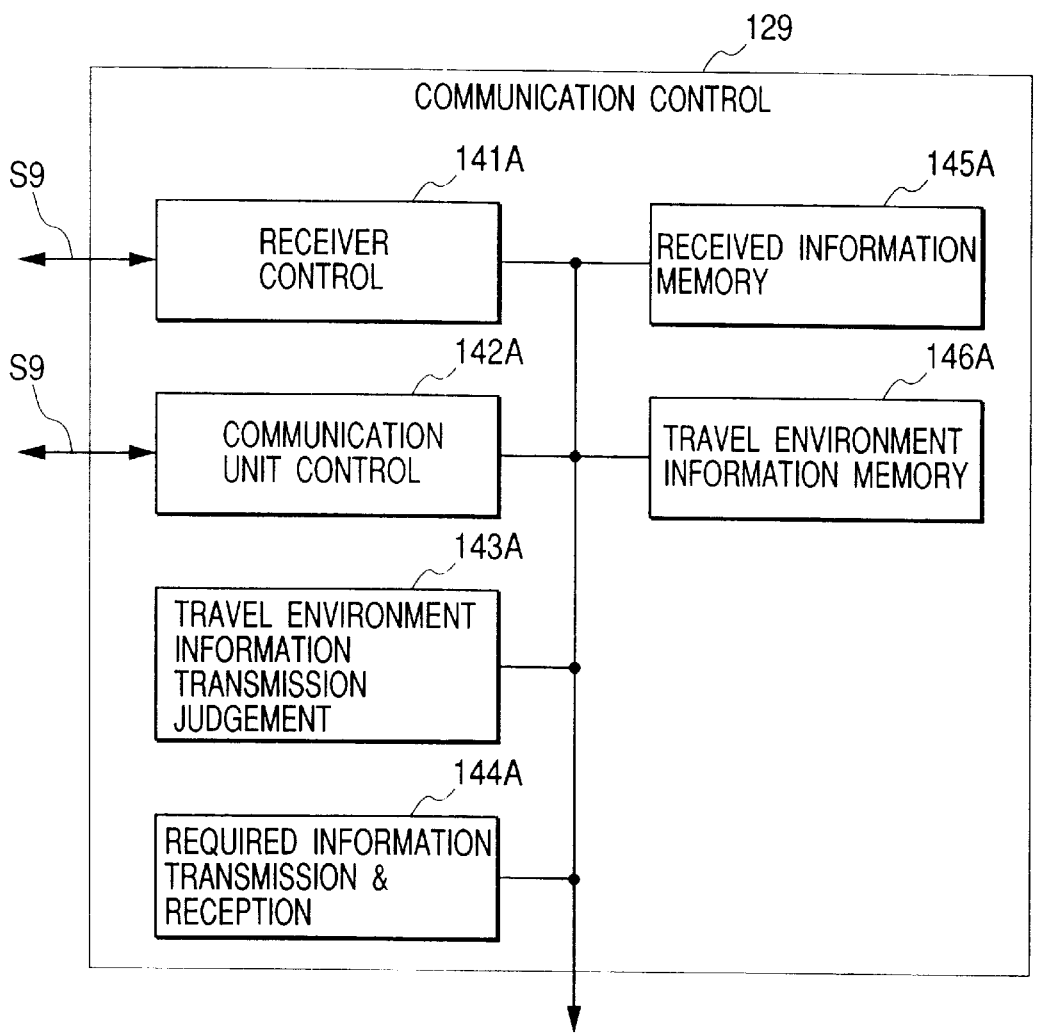
FIG. 12 is a block diagram showing a structural example of the communication control means as shown in FIG. 11.

FIG. 12 is a block diagram showing a structural example of the communication control means 129. Hereinbelow, the respective constituting elements will be explained.

The receiver control means 141A operates to control the broadcasting signal receiving unit 14 mounted on the moving body 10 and to transfer the received data transmitted from the receiving unit 14 to which the LAN 109 is connected to a received information memory means 145A. Herein, the receiving unit 14 is a signal receiving unit such as for a beacon unit such as a photo beacon and radio wave beacon disposed along roads, a ground wave TV broadcasting including such as letter broadcasting, a radio broadcasting, a FM multiplex broadcasting, a pager and satellite broadcasting, and the receiver control means 141A controls the respective units for such receiving unit 14 so as to select the channel broadcasting of road environment information, and further selects data relating to the road environment information among the received data and transfers the same to the received information memory means 145A.

The received information memory means 145A stores traffic jam information, traffic jam degree information, road surface condition information and weather information of respective roads in every road link unit based on the road environment information received at the receiver control means 141A and the road environment information obtained from the communication unit control means 142A. A memory format example within the memory unit is illustrated in FIG. 15(*b*).

Figures 15A, 15B:
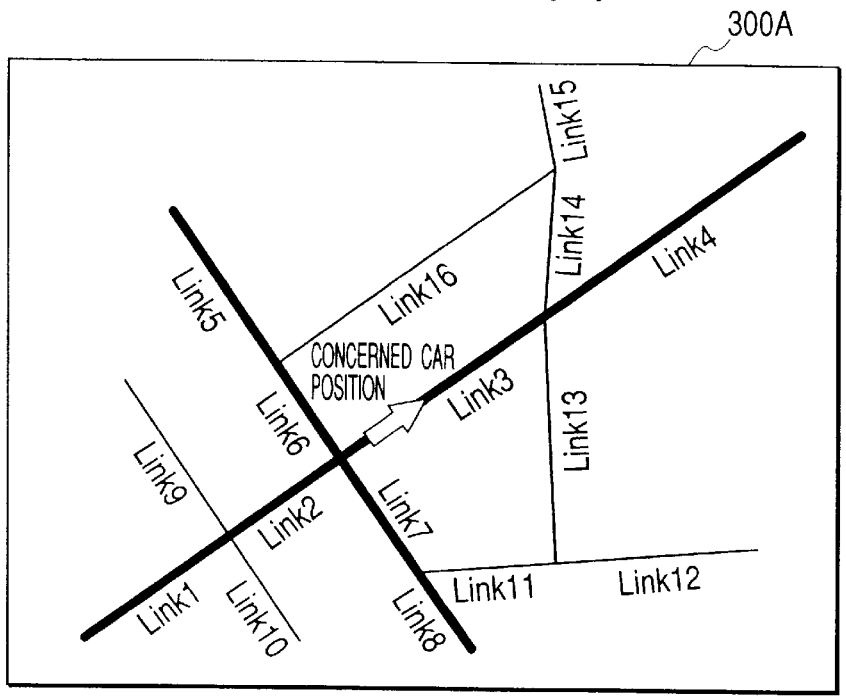
FIG. 15(a) is an explanatory view showing a link structure in travel environment information used in the present invention.
FIG. 15(b) is a diagram showing a data format example of travel environment information for every link in FIG. 15(a)

For example, the road environment information of a road network of which road links are connected as shown by numeral 300A in FIG. 15(*a*) can be managed with respect to traffic jam information 301*a*, road surface condition information 301*b*, weather information 301*c* and updated time 301*f* in respective link units and in upward and downward line units for each link as illustrated in FIG. 15(*b*). With this memory format the road environment information of a required road link can be obtained by designating the same with one solution. Further, when being received changes of travel environment in association with time, the memory contents are updated by the latest information.

The communication unit control means 142A controls the communication unit 13 provided in the moving body 10 so that a communication line is connected between an objective communication couple and the communication unit 13, and operates to transmits/receives the provided data. Herein, the communication unit 13 is a unit which enables bidirectional communication with a predetermined communication couple and is not limited to a specific device. Namely, the communication unit 13 can be such as a cellular communication and PHS which permit communication between ground stations arranged in cell shape and a moving body as well as a communication via a satellite rotating along a low height orbit and MCA communication can also be used.

The travel environment information memory means 146A stores the road environment information with regard to roads through which the vehicle concerned has travelled in road link unit which is collected by the traffic jam information analysis means 121A, the road surface information analysis means 122A and the weather analysis means 123A.

Another memory format example is illustrated in FIG. 16. In this format, in a addition to the memory items as indicated in connection with the memory format as shown in FIG. 15(*b*), time information 301*d* when the vehicle concerned moves in the concerned link and time information 301*e* when the vehicle concerned moves out the concerned link are stored in addition. These are one of indispensable information and is used to transmit the newness of the information to the side of the information center 21 as well as used to select the latest road environment information with priority. Further, with regard to the time information an accurate time information can be obtained by making use of the time information outputted, for example, from the GPS receiver 108.

The travel environment information transmission judgement means 143A judges whether to start transmission of the collected road environment information depending on variation of travel environment information to the information center 21 via the communication unit control means 142A. There are a plurality of cases when determining the start of transmission of the collected road environment information to the information center 21.

(1) In first case, the road environment informations for the travel road link concerned stored respectively in the received information memory means 145A and the travel environment information memory means 146A are compared, and if the comparison result is different, the system operates to transmits the information to the information center 21.

With the use of the present processing since the system operates to perform communication only when the traffic environment of the road concerned varies, the communication volume is greatly reduced.

Further, the road environment information can be compared in respective road link units and only the information showing difference can be communicated. Still further, in order to reduce communication frequency only when the result of comparison of the road environment information in respective road units differs more than a predetermined times, the information showing difference can be communicated.

(2) In second case, after comparing the road environment informations of the travel road link concerned stored respectively in the received information memory means 145A and the travel environment information memory means 146A, and if it is judged that the road environment information relating to the road link along which the moving body concerned has travelled is not stored in the received information memory means 145A, the system operates to transmits the information to the information center 21. Further, the fact that no road environment information is stored implies that information relating to the road link is not distributed or unclear, but never indicates that there is no traffic jam in the road link concerned or no traffic obstacle is generated.

With the use of the present processing, since the road environment information relating to the road of which information has not been collected is transmitted to the information center 21, the information volume stored in the information center 21 further enriches. Further, the information relating to the road links stored in the received information memory means 145A is excluded from the collection, communication volume is likely reduced.

Further, the communication can be performed in respective road link units, and further, in order to reduce communication frequency the road environment information can be inclusively communicated in a unit of a plurality of road links.

(3) In third case, a changing point of the road environment information stored in the travel environment information memory means 146A is judged, and when it is judged that a change is occurred therein, the system operates to communicate the information to the information center 21. The occurrence of change implies that, for example, with regard to traffic jam of the road now travelling when change from non-traffic jam to traffic jam or vice versa is observed, with regard to road surface condition information when an obstacle is found out or when change from non-slippery condition to slippery condition is observed, and with regard to weather information when the weather changes from cloudy to snow.

With the use of the present processings, since the system operates to communicate the information to the information center 21, only when the above exemplified road environment information has changed, the communication volume can be reduced.

A required information transmission and reception means 144A judges whether to communicate with the information center 21 so as to obtain value added information required by the user, and operates to transmit the required information to the information center 21 as well as to transmit at the same time the collected road environment information to the information center 21 in combination.

Now, these retrieval request information data volume transmitted from the moving body 10 to the information center 21 is mostly significantly small in comparison with the data volume of the retrieval result. Accordingly, during the waiting time before the retrieval result being outputted if the information relating to the road through which the vehicle concerned has travelled and being collected by the traffic jam information analysis means 121A, the road condition information analysis means 122A and the weather information analysis means 123A is transmitted together with the retrieval request information, real time road environment information can be transmitted to the information center 21 without increasing the communication line load for the sides of the user and the information center 21.

Further, it is preferable that the user can select whether the road environment information collected at the side of the moving body 10 be transmitted to the side of the information providing center 21. With this measure, the privacy of the user can be protected. Further, the road environment information collected by the moving body 10 can be transmitted from the moving body 10 to the information center 21 by makings use of time when the retrieved result is transmitted from the information center 21 to the moving body 10.

This measure is characterized in that during the interval when the retrieved result is being transmitted to the moving body 10, in other words, during the interval when the downwarding line is used, the upwarding line is generally not used, however, the road environment information is transmitted to the information center 21 via the generally non-used upwarding line. Accordingly, the road environment information can be transmitted without increasing any communication expense of the user.

Further, it is preferable to limit the data volume of the road environment information to be transmitted to a predetermined volume which can be transmitted until the transmission of the answer information is ended, more specifically the data volume of the road environment information is equal to or less than the data volume of the answer information when assuming that the data transferring speed of upward/downward lines is equal.

Further, when it is required to further limit the transmission data volume, it is preferable to selectively transmit the latest information with priority and to discard older information.

With this measure, like the above explained measure, real time road environment information can be transmitted to the information center 21 without increasing the communication line load for the sides of the user and the information center 21.

Figure 13:
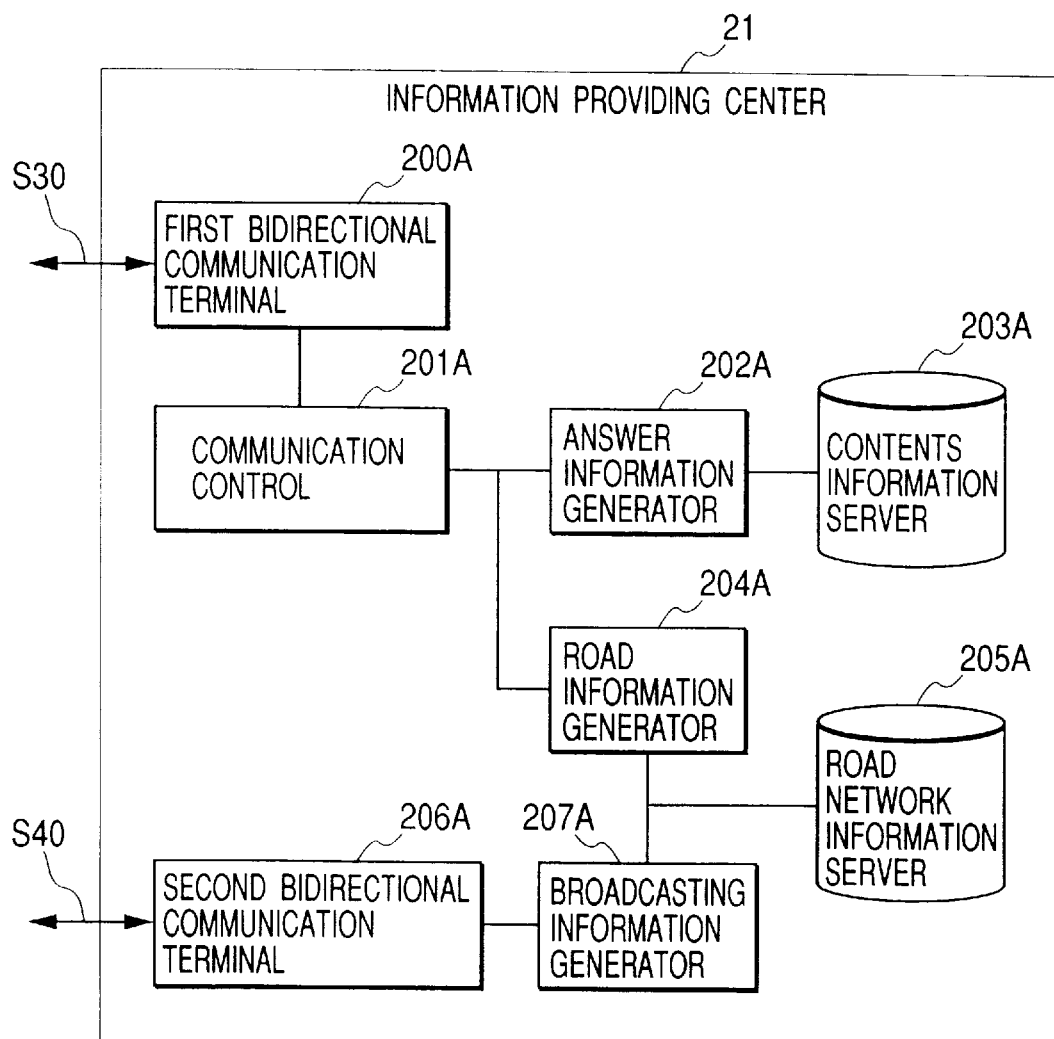
FIG. 13 is a block diagram showing another structural example of the information providing center as shown in FIG. 1.

FIG. 13 is a block diagram showing another structure example of the information center 21. Hereinbelow, the respective constituting elements will be explained.

The information center 21 is designed to operate to collect such as road environment information and content information which are thought necessary for the moving body 10, to record the same in servers 203A and 205A, to retrieve the servers 203A and 205A in response to the request of the user, to generate answer information and to broadcast road environment information by making use of the broadcasting station 22, and comprises a first bidirectional communication terminal 200A, communication control unit 201A, an answer information generating unit 202A, the content information server 203A, a road information generating unit 204A, the road network information server 205A, a second bidirectional communication terminal 206A and a broadcasting information generating unit 207A.

The first bidirectional communication terminal 200A is a unit for connecting the communication line 20 and the information providing center 21 and is constituted by either by digital phone or by analogue phone. When constituting the first bidirectional communication terminal 200A by the analogue phone, the analogue signals are converted into digital signals by making use of a modem.

The communication control unit 201A is a unit for controlling data flow, and transfers the information transferred from the moving body 10 to the answer information generating unit 202A, if the information is retrieval request information necessary for generating answer information or to the road information generating unit 204A if the information is travel environment information collected by the moving body 10. Further, the communication between the moving body 10 and the first bidirectional communication terminal 200A is disconnected after completing transmission of the answer information in connection with retrieval request information and after completing information transference in case when only road environment information is concerned.

The answer information generating unit 202A analyzes the contents of the retrieval request information, takes out necessary information from the content information server 203A, generates answer information and communicates the answer information to the moving body 10. Further, when the user requests road environment information such as traffic jam information, the answer information generating unit 202A operates to access the road network information server 205A and generates answer information.

The content information server 203A is a unit which collects a variety of information including dynamic information and static information and stores the same. Although not illustrated in FIG. 13, the content information server 203A is connected such as to exclusive line networks and internet for collecting external information and always stores the latest information.

The road information generating unit 204A is designed to operate to update the road network information server 205A based on the road environment information being transmitted time to time from the moving body 10.

The road network information server 205A is a device which collects and stores static information relating to road network, namely such as road position and link connecting relation, and dynamic information, namely such as traffic jam information. Further, the road network information server 205A can accumulate further accurate information by storing not only the road environment information transmitted from the moving body 10 but also the information obtained from such as sensors and monitoring cameras arranged along the road sides.

The broadcasting information generating unit 207A reads road environment information from the road network information server 205A and generates a format for a predetermined region, thereby generates information transmitted from the broadcasting station 22.

The second bidirectional communication terminal 206A transfers the information generated by the broadcasting information generating unit 207A to the broadcasting station 22. Further, the communication line with which the second bidirectional communication terminal 203A is connected can be either a public communication line network or an exclusive line. The broadcasting station 22 broadcasts the road information transmitted from the information server while mixing the same with other information to be broadcasted.

Figure 14:
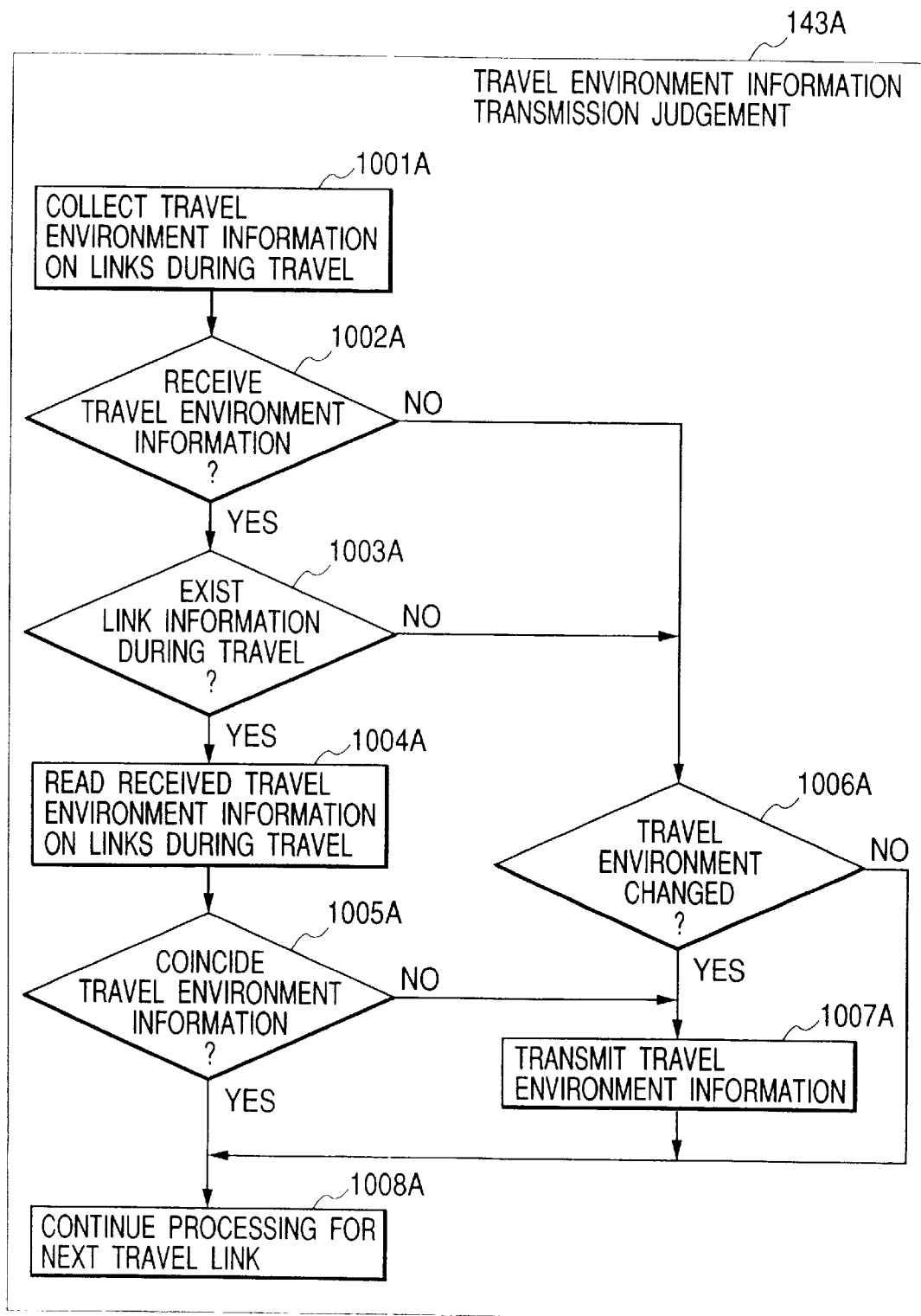
FIG. 14 is a still another flow chart showing still another processing flow executed in the arithmetic unit as shown in FIG. 2.

FIG. 14 is a flow chart showing a processing flow example for transmission judgement of the collected road environment information which is performed at the travel environment information transmission judgement means 143A in the arithmetic unit 100 for the information processing unit 11. Hereinbelow, the respective processings will be explained with reference to the flow chart.

In step 1001A, travel environment information of the link now travelling is collected in cooperation with the traffic jam analysis means 121A, the road surface information analysis means 122A and the weather analysis means 123A. Further, the link information of now travelling is outputted from the map matching means 126 which judges the road link now travelling while comparing the calculated position information outputted from the current position calculating means 125 with the map data. Further, the road environment information obtained from respective links is stored for every link together with the time information of moving in and out for the link concerned in the travel environment information memory means 146A in the format illustrated in FIG. 16.

In step 1002A, it is judged whether the travel environment information can be received via the broadcasting signal receiving unit 14. For example, when the moving body 10 is in the outside of the service area of the concerned broadcasting station 22 or when the unit 14 is not ready for receiving the information, because the power source of the unit 14 is just turned on, the process moves to step 1006A, and when it is judged that the unit 14 was ready for receiving information and has already received enough travel environment information near the road now travelling, the process moves to step 1003A.

In step 1003A, the road environment information stored in the received information memory means 145A is accessed and it is judged whether information relating to the road link now travelling is stored. The fact that no road environment information is stored implies that no information relating to the road link concerned is received or unclear, however never represents no traffic jam of the road link concerned or no obstacle is generated. When it is judged nothing is stored, the process moves to step 1006A, and if it is judged that related information is stored, the process moves to step 1004A.

In step 1004A, the received information memory means 145A is accessed and travel environment information with regard to the road link now travelling is read out.

In step 1005A, it is judged whether the travel environment information with regard to the road link now travelling, namely such as traffic jam information 301a, road surface condition information 301b and weather information 301c, which are stored in the received information memory means 145A and the travel environment information memory means 146A are respectively equal. Further, the items to be compared herein can be an independent single item such as traffic jam information or a combination of a plurality of items.

When it is judged that the both informations are equal this implies that the information stored in the information center 21 is updated to the latest one, therefore, it is unnecessary to transmit the travel environment information from the side of the moving body 10, thus the process moves to step 1008A. On the other hand, when it is judged that the both informations are not equal, it is implied that the information stored at the side of the information center 21 is old, therefore, the process moves to step 1007A.

In step 1006A, the travel environment information memory means 146A is accessed, and it is judged whether the travel environment of the road link now travelling has changed from the previous travel environment of the road link now travelling.

An example of such judgement processing is explained hereinbelow.

For example, with regard to traffic jam information, if the link immediately before is judged in non-traffic jam and the link now travelling is judged in traffic jam, it is judged that change in travel environment occurred. Further, in order to enhance traffic jam judgement accuracy, it can be determined traffic jam is occurring when traffic jam continues over a predetermined number of links, and no traffic jam is determined occurring when non-traffic jam continues over a predetermined number of links. Further, when the road classes or the road width of the road link now travelling changes, such is taken into account for judging traffic jam. Still further, for example, with regard to road surface condition information when the road surface changes from dry condition to wet condition, it is judged that the travel environment is changed, and the process moves to step 1007A and when it is judged that the travel environment does not change, the process moves to step 1008A.

In step 1007A, the travel environment information transmission judgement means 143A operates to transmit the travel environment information collected by the moving body 10 via the communication unit 13 to the information center 21. Thereby, the road network information server 205A in the information center 21 is updated by the latest information, thus other users can always enjoy the latest information. Further, if every time when inconsistency or changes in travel environment for respective link units is observed, the collected travel environment information is transmitted to the information center 21, the communication times can increase. Therefore, if the number of movement to the step 1007A is counted and the collected travel environment information is transmitted to the information center 21 only after the number of the movement exceeds a predetermined number, the transmission number can be further decreased.

Still further, instead of the above movement number, the transmission timing can be determined with a predetermined time interval and if the travel environment has changed in the predetermined time interval, the travel environment information is transmitted to the information center 21.

In step 1008A, the subsequent travel road link is used as objective, therefore, after judging the change of the travel road link, the process moves to step 1001A.

Through the above explained operation of the travel environment information collecting device according to the present embodiment, the device operates to transmit travel environment information during travel of the moving body to the information center 21 depending on necessity, the communication frequency and communication time for information transmission can be reduced.

The travel environment information collecting device according to the present invention as has been explained above operates to determine transmission timing of the collected travel environment information to the information center through detection of changing point of the travel environment information collected by the moving body and through comparison with the broadcasted travel environment information, thereby, the communication frequency and communication time between the moving body and the information center can be reduced without deteriorating the quality of the travel environment information collected by the information center.

The above advantage contributes to reduce communication cost in such a manner to decrease user use fee.

Further, according to the present invention, the frequency when information is transmitted at the same time from a plurality of moving bodies is reduced, therefore, the number of communication terminals to be provided at the side of the information center can be reduced.

What is claimed is:

1. A broadcasting type information providing system including a moving body side device mounted on a moving body and an information providing side device for providing information to the moving body side device, characterized in that the moving body side device comprises:

a position measuring means which measures the position of the moving body concerned;

a moving body side communication means which performs bidirectional communication with the information providing side device;

an information requesting means which transmits request information representing request contents of a user and the measured position information of the moving body to the information providing side device via the moving body side communication means;

a receiving means which receives answer information with respect to the request information being transmitted from the information providing side device; and an information presenting means which presents the received answer information to the user, and further characterized in that the information providing side device comprises:

a first information providing side communication means which performs bidirectional communication with the moving body side communication means;

an answer information editing means which generates answer information to the request information transmitted from the moving body via the first information providing side communication means;

a second information providing side communication means which performs communication with a broadcasting installation performing broadcasting for a specific service area so as to transmit the answer information to the moving body; and a control means which selects a broadcasting installation of which service area includes a position at which the moving body receives the answer information based on the position information of the moving body, which is transmitted from the moving body via the first information providing side communication means, transmits the answer information to the selected broadcasting installation via the second information providing side communication means and causes to broadcast the answer information from the selected broadcasting installation.

2. A broadcasting type information providing system including a moving body side device mounted on a moving body and an information providing side device for providing information to the moving body side device, characterized in that the moving body side device comprises:

a moving body side communication means which performs bidirectional communication with the information providing side device via base stations arranged in a cell shape;

an information requesting means which transmits request information representing request contents of a user to the information providing side device via the moving body side communication means;

a receiving means which receives answer information with respect to the request information being transmitted from the information providing side device; and an information presenting means which presents the received answer information to the user, and further characterized in that the information providing side device comprises:

a first information providing side communication means which performs bidirectional communication with the moving body side communication means;

a position measuring means which measures the position of the moving body based on the information relating to the position of the via base station during the communication with the moving body side communication means;

an answer information editing means which generates answer information to the request information transmitted from the moving body via the first information providing side communication means;

a second information providing side communication means which performs communication with a broadcasting installation performing broadcasting for a specific service area so as to transmit the answer information to the moving body; and a control means which selects a broadcasting installation of which service area includes a position at which the moving body receives the answer information based on the position information of the moving body measured by the position measuring means, transmits the answer information to the selected broadcasting installation via the second information providing side communication means and causes to broadcast the answer information from the selected broadcasting installation.

3. A broadcasting type information providing system including a moving body side device mounted on a moving body and an information providing side device for providing information to the moving body side device, characterized in that the moving body side device comprises:

a moving body side communication means which performs bidirectional communication with the information providing side device;

an information requesting means which transmits request information representing request contents of a user to the information providing side device via the moving body side communication means;

a receiving means which receives answer information with respect to the request information being transmitted from the information providing side device; and an information presenting means which presents the received answer information to the user, and further characterized in that the information providing side device comprises:

a first information providing side communication means which performs bidirectional communication with the moving body side communication means;

an answer information editing means which generates answer information to the request information transmitted from the moving body via the first information providing side communication means;

a second information providing side communication means which performs communication with a broadcasting installation performing broadcasting for a specific service area so as to transmit the answer information to the moving body; and a control means which evaluates predetermined items with regard to generation and transmission of the answer information and, when transmitting the answer information, determines whether the answer information be transmitted via the first information providing side communication means or via the selected broadcasting installation depending on the evaluation result of the predetermined items.

4. A broadcasting type information providing system according to claim 3, wherein said control means in the information providing side device uses as the evaluation items at least one of a crowded degree of broadcasting signals in the broadcasting installation in which the answer information is to be broadcasted, a communication speed between the information providing side communication means and the moving body side communication means, data volume in the answer information, a required time for generating the answer information and a time dependency of the answer information, and determines the communication route to be used when transmitting the answer information depending on the evaluation result of the predetermined items.

5. A broadcasting type information providing system according to claim 3, characterized in that the moving body side device further comprises a selecting means which performs selection of the communication route to be used when transmitting the answer information, wherein said information requesting means transmits the information relating to the selection together with the request information to the information providing side device and said control means in the information providing side device determines the communication route when transmitting the answer information depending on the selection information.

6. A broadcasting type information providing system according to claim 3, characterized in that either the moving body side device or the information providing side device is provided with a position measuring device which measures the position of the moving body, said control means in the information providing side device, instead of evaluating the predetermined items with regard to generation and transmission of the answer information, determines whether the answer information be transmitted via the first information providing side communication means or via the broadcasting installation depending on the measured position of the moving body.

7. A broadcasting type information providing system according to claim 1, characterized in that said moving body side device further comprises a destination setting means which sets a destination of the moving body, and said information requesting means transmits the information relating to the destination together with the request information and the position information to the information providing side device, and said control means in the information providing side device further comprises a position estimating means which estimates the position of the moving body at the moment when the answer information is transmitted based on the position information and the destination information being transmitted from the moving body.

8. A broadcasting type information providing system including a moving body side device mounted on a moving body and an information providing side device for providing information to the moving body side device, characterized in that the moving body side device comprises:

a moving body side communication means which performs bidirectional communication with the information providing side device;

an information requesting means which transmits request information representing request contents of a user to the information providing side device via the moving body side communication means;

a broadcast receiving means which receives answer information with respect to the request information being broadcasted from the information providing side device; and an information presenting means which presents the received answer information to the user, and further characterized in that the information providing side device comprises:

a first information providing side communication means which performs bidirectional communication with the moving body side communication means;

an answer information editing means which generates answer information to the request information transmitted from the moving body via the first information providing side communication means; and a broadcasting means for transmitting the answer information to the moving body, and further characterized in that the moving body side device further comprises a device control means for controlling the broadcast receiving means so as to receive broadcasting of the answer information by the broadcasting means.

9. A broadcasting type information providing system according to claim 8, characterized in that said device control means performs at least one of on and off of a power source and changing-over of receiving channels for the broadcast receiving means depending on information relating to broadcast schedule in the answer information which is to be transmitted via the first information providing side communication means and the moving body side communication means.

10. An information providing side device for a broadcasting type information providing system and for providing information to a moving body side device mounted on a moving body, characterized in that the information providing side device comprises:

a first information providing side communication means which performs bidirectional communication with the moving body side communication means;

an answer information editing means which generates answer information to request information transmitted from the moving body via the first information providing side communication means;

a second information providing side communication means which performs communication with a broadcasting installation performing broadcasting for a specific service area so as to transmit the answer information to the moving body; and a control means which selects a broadcasting installation of which service area includes a position at which the moving body receives the answer information, transmits the answer information to the selected broadcasting installation via the second information providing side communication means and causes to broadcast the answer information from the selected broadcasting installation.

11. An information providing side device for a broadcasting type information providing system and for providing information to a moving body side device mounted on a moving body, characterized in that the information providing side device comprises:

first information providing side communication means which performs bidirectional communication with the moving body side communication means;

an answer information editing means which generates answer information to request information transmitted from the moving body via the first information providing side communication means;

a second information providing side communication means which performs communication with a broadcasting installation performing broadcasting for a specific service area so as to transmit the answer information to the moving body; and a control means which evaluates predetermined items with regard to generation and transmission of the answer information and, when transmitting the answer information, determines whether the answer information be transmitted via the first information providing side communication means or via the selected broadcasting installation depending on the evaluation result of the predetermined items.

12. An information processing and communicating device which is mountable on a moving body, for receiving information from an information providing side device via an information broadcasting system; said information processing and communication device comprising:

a position measuring means which measures the position of the moving body;

a moving body side communication means which performs bidirectional communication with the information providing side device;

an information requesting means which transmits information requests and measured position information of the moving body to the information providing side device via the moving body side communication means;

a broadcast receiving means which receives answer information with respect to an information request, being broadcasted from the information providing side device;

an information presenting means which presents the received answer information to the user; and a device control means for controlling the broadcast receiving means so as to receive the answer information being transmitted via the broadcasting.

13. A travel environment information collection device which is mountable on a vehicle, said travel environment information collecting device comprising:

a collecting means which collects travel environment information concerning a road on which the vehicle is travelling;

a receiver means which receives travel environment information being transmitted via broadcasting from an information center which stores in advance travel environment information;

a judgment means which determines whether updating or new generation for a part of the received travel environment information is necessary, based on the collected travel environment information; and a transmitting means which transmits travel environment information collected by the collecting means to the information center, to be used for processing as travel environment information, when the judgment means determines that either updating or new generation processing is necessary.

14. A travel environment information collection device which is mountable on a vehicle, said travel environment information collection device comprising:

a collecting means which collects travel environment information concerning a road on which the vehicle is travelling;

a receiver means which receives travel environment information being transmitted via broadcasting from outside;

a comparison means which compares collected travel environment information with corresponding travel environment information included in the received travel environment information; and a transmitter means which transmits collected travel environment information to an information center external to the vehicle when the travel environment information compared in the comparison means are determined to be different.

15. A travel environment information collection device which is mountable on a vehicle, and comprises:

a collecting means which collects travel environment information concerning a road on which the vehicle is travelling;

a receiver means which receives travel environment information being transmitted from outside;

a judgment means which determines whether information relating to the road on which the vehicle concerned is now travelling is included in the received travel environment information; and a transmitting means which, when the judgment means determines that the information relating to the road on which the vehicle concerned is now travelling is not included in the received travel environment information, transmits the travel environment information collected by the collecting means with regard to the road region which is determined not included in the received travel environment information to an information center installed in the outside.

16. A travel environment information collecting device which is mountable on a vehicle, and comprises:

a collecting means which collects travel environment information concerning a road on which the vehicle is travelling;

an environmental change judgment means which determines whether a travel environment change from previous one has happened for the vehicle concerned; and a transmitting means which transmits collected travel environment information to an information center external to the vehicle when the environment change judgment means determines the travel environment has changed.

17. A travel environment information collecting device according to claim 13, characterized in that the travel environment information collected by the collecting means includes at least one of traffic jamming information, road condition information and weather information.

18. A travel environment information collecting device according to claim 14, characterized in that the travel environment information collected by the collecting means includes at least one of traffic jamming information, road condition information and weather information.

19. A travel environment information collecting device according to claim 15, characterized in that the travel environment information collected by the collecting means includes at least one of traffic jamming information, road condition information and weather information.

20. A travel environment information collecting device according to claim 16, characterized in that the travel environment information collected by the collecting means includes at least one of traffic jamming information, road condition information and weather information.

21. A travel environment information collecting device according to claim 17, characterized in that the travel environment information collecting device further comprises a position measurement means which measures the position of the vehicle concerned and wherein the travel environment information collected by the collecting means includes position information with respect to the position where the travel environment information is collected and time information with regard to the time when the travel environment information is collected.

22. A travel environment information collecting device according to claim 18, characterized in that the travel environment information collecting device further comprises a position measurement means which measures the position of the vehicle concerned and wherein the travel environment information collected by the collecting means includes position information with respect to the position where the travel environment information is collected and time information with regard to the time when the travel environment information is collected.

23. A travel environment information collecting device according to claim 19, characterized in that the travel environment information collecting device further comprises a position measurement means which measures the position of the vehicle concerned and wherein the travel environment information collected by the collecting means includes position information with respect to the position where the travel environment information is collected and time information with regard to the time when the travel environment information is collected.

24. A travel environment information collecting device according to claim 20, characterized in that the travel environment information collecting device further comprises a position measurement means which measures the position of the vehicle concerned and wherein the travel environment information collected by the collecting means includes position information with respect to the position where the travel environment information is collected and time information with regard to the time when the travel environment information is collected.

25. A travel environment information collecting device mounted on a vehicle, characterized in that, the travel environment information collecting device comprises:

a position measuring means which measures the position of the vehicle concerned;

a traffic jam information collecting means which collects traffic jam information representing whether the road on which the vehicle concerned is now travelling is in traffic jam; and a transmitting means which transmits the traffic jam information and the position information representing the position of the vehicle concerned which is measured by the position measurement means to an information center installed in the outside, when the traffic jam information collected by the traffic jam information collecting means changes from non-traffic jamming to traffic jamming.

26. A travel environment information collecting device which is mountable on a vehicle, and comprises:

a collecting means which collects travel environment information concerning a road on which the vehicle is travelling;

a transmitting means which transmits an information retrieval request including locating information, associating information, and image information of facilities to an information center installed external to the vehicle; and a receiving means which receives answer information with respect to the information retrieval request transmitted from the information center;

wherein the transmitting means transmits the travel environment information collected by the collecting means together with the information retrieval request to the information center.

27. A travel environment information collecting device according to claim 26, further characterized in that the travel environment information collecting device further comprises transmission control means which limits transmitting information volume of the travel environment information so that the transmission of the travel environment information collected by the collecting means is completed until the reception of the answer information with regard to the information retrieval request being transmitted from the information center is completed.

28. An information providing system comprising a travel environment information collection device which is mountable on a vehicle, and collects information relating to the travel environment of a road on which the vehicle is travelling, and an information center which stores information relating to travel environment as well as provides the stored travel environment information to vehicles, wherein the travel environment information collecting device comprises:

a collecting means which collects travel environment information concerning a road on which the vehicle is currently travelling;

a receiving means which receives travel environment information transmitted via broadcasting from the information center;

a judgment means which determines whether updating or new generation of information for a part of the received travel environment information is necessary, based on the collected travel environment information;

a transmitting means which transmits the travel environment information collected by the collecting means, for processing at the information center when the judgment means determines that either updating or the new generation of information is necessary; and the information center includes, a memory means which stores travel environment information;

a transmitting means which transmits the stored travel environment information;

a receiving means which receives travel environment information transmitted from the travel environment information collecting device; and an updating means which updates or newly generates at least a part of the travel environment information stored in the memory means based on the received travel environment information.

* * * * *